(12) United States Patent
Washio

(10) Patent No.: US 8,837,838 B2
(45) Date of Patent: Sep. 16, 2014

(54) IMAGE PROCESSING APPARATUS AND IMAGE PROCESSING METHOD

(71) Applicant: Konica Minolta, Inc., Tokyo (JP)

(72) Inventor: Koji Washio, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 72 days.

(21) Appl. No.: 13/768,757

(22) Filed: Feb. 15, 2013

(65) Prior Publication Data

US 2013/0216137 A1    Aug. 22, 2013

(30) Foreign Application Priority Data

Feb. 21, 2012  (JP) ................. 2012-034772

(51) Int. Cl.
| | |
|---|---|
| G06K 9/48 | (2006.01) |
| G06T 7/00 | (2006.01) |
| G06K 9/46 | (2006.01) |
| H04N 1/409 | (2006.01) |
| G06T 5/00 | (2006.01) |

(52) U.S. Cl.
CPC ............ *G06K 9/4604* (2013.01); *G06T 7/0085* (2013.01); *H04N 1/4092* (2013.01); *G06T 5/008* (2013.01)
USPC .......................................... 382/199; 382/200

(58) Field of Classification Search
USPC ............ 345/947; 348/252, 597, 625, E5.052; 358/2.1, 3.15, 3.27; 382/199, 200, 266
See application file for complete search history.

(56) References Cited

U.S. PATENT DOCUMENTS

| | | | |
|---|---|---|---|
| 2002/0135790 A1* | 9/2002 | Ishiguro | 358/1.9 |
| 2009/0208129 A1* | 8/2009 | Shimodaira | 382/264 |
| 2011/0205241 A1* | 8/2011 | Akiyoshi | 345/599 |

FOREIGN PATENT DOCUMENTS

JP          2005-341249         12/2005

* cited by examiner

*Primary Examiner* — Gregory F Cunningham
(74) *Attorney, Agent, or Firm* — Osha Liang LLP

(57) ABSTRACT

An image processing apparatus includes a first edge extraction unit, an edge processing unit, a second edge extraction unit, a third edge extraction unit and a gradation processing unit. The gradation processing unit performs gradation processing on image data on which edge processing has been performed by the edge processing unit, and switches contents of the gradation processing on the basis of whether a pixel of the image data is a third edge pixel or a no-third edge pixel to enhance a third edge region as compared with another region. The third edge extracted by the third edge extraction unit is constituted of a first edge extracted by the first edge extraction unit as an edge pixel of an object and a second edge extracted by the second edge extraction unit as a pixel having a pixel value changed by the edge processing.

20 Claims, 15 Drawing Sheets

FIG.2

|  |  | MAIN-SCANNING DIRECTION → |  |  |  |  |
|---|---|---|---|---|---|---|
| 01 | 02 | 03 | 04 | 05 | 06 | 07 |
| 08 | 09 | 10 | 11 | 12 | 13 | 14 |
| 15 | 16 | 17 | 18 | 19 | 20 | 21 |
| 22 | 23 | 24 | 25 | 26 | 27 | 28 |
| 29 | 30 | 31 | 32 | 33 | 34 | 35 |
| 36 | 37 | 38 | 39 | 40 | 41 | 42 |
| 43 | 44 | 45 | 46 | 47 | 48 | 49 |

SUB-SCANNING DIRECTION ↓

FIG.3

☐ :CONTINUOUS TONE PROCESSING
▨ :SCREEN PROCESSING

☐ :THIRD EDGE

☐ :CONTINUOUS TONE PROCESSING
▨ :SCREEN PROCESSING

☐ :CONTINUOUS TONE PROCESSING
▨ :SCREEN PROCESSING

☐ :CONTINUOUS TONE PROCESSING
▨ :SCREEN PROCESSING

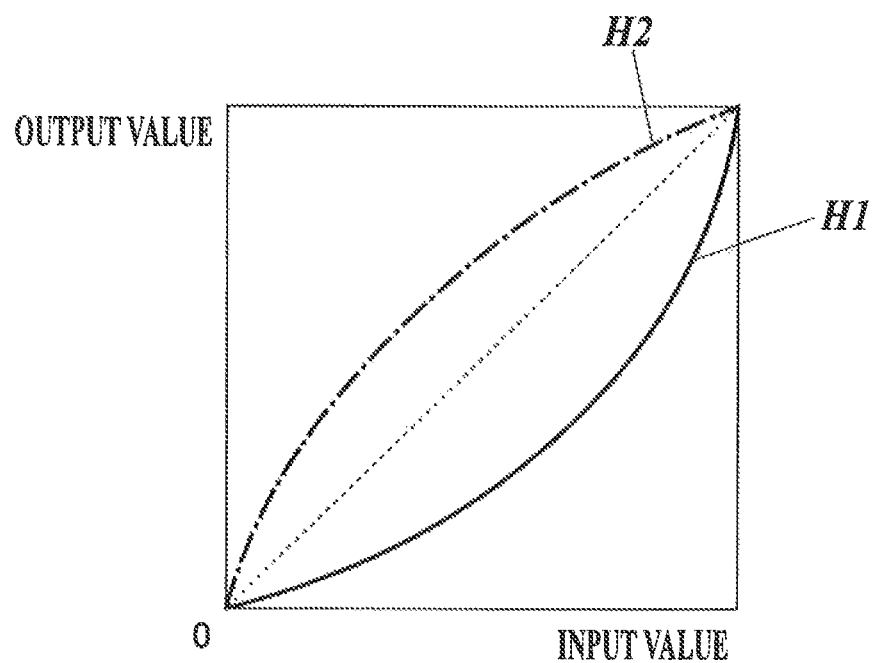

IMAGE PROCESSING APPARATUS AND IMAGE PROCESSING METHOD

BACKGROUND OF THE INVENTION

1. Field of the Invention

The present invention relates to an image processing apparatus and an image processing method.

2. Description of the Related Art

Conventionally, increase of image quality of letters in printed materials has been addressed by performing edge processing on image data including letters only, the edge processing by which the edge of each letter is extracted, and pixel values of pixels of the edge are adjusted. As a type of the edge processing, thinning processing is known. By the thinning processing, the pixel values of the edge of a letter are reduced so as to make the letter thin. Accordingly, a shape letter can be reproduced.

On the other hand, on image data including pictures only, gradation processing, such as screen processing or error diffusion processing, is performed so as to express halftones.

However, in general, many printed materials, such as catalogues or magazines, have both letters and pictures. Even when a printed material has only letters, various densities and colors are used for the letters, and accordingly the screen processing is necessary to reproduce the densities and colors.

Because the screen processing gives a shape of a dot or line to a target, if the screen processing is performed on image data including a letter, jaggies may be generated in the contour of the letter, and accordingly a smooth line cannot be reproduced. Consequently, the image quality of the letter may decrease. In order to prevent jaggies, types of the screen processing are switched. That is, the screen processing with a high screen ruling (lpi) is performed on the edge of a letter only. Alternatively, the edge of a letter is excluded from a target for the screen processing. For example, in Japanese Patent Application Laid-Open Publication No. 2005-341249, there is disclosed a method of performing the thinning processing to reduce the pixel values of the edge of a letter, performing continuous tone processing on the edge thereafter, and performing the screen processing on the other region.

Another type of the edge processing is smoothing processing. By the smoothing processing, the edge of a slant part of a letter is identified by pattern matching or the like, and the pixel values of the edge are changed gradually taking a step of the slant part as a center. Accordingly, a smooth line can be reproduced.

Conventionally, the smoothing processing has been performed after the screen processing. This is because it is easier to identify the edge of a slant part by the pattern matching if binary image data obtained by the screen processing is a target for the smoothing processing. In the pattern matching, it is necessary to know the pixel values of an attention pixel and its surrounding pixels together. If the target is binary image data, it is only necessary to determine whether gradations are the maximum value or the minimum value, so that the pixel values of pixels can be easily known. Furthermore, by limiting the target to solid letters (the letters having a gradation of the maximum value), even after the screen processing is performed so as to produce binary image data, the pattern matching can be performed with no influence of the screen processing, which has been convenient.

However, once gamma correction processing to keep print densities uniform starts to be performed in a printer or the like, inconvenience arises. Gamma correction curves used for the gamma correction processing are often updated to deal with printing characteristics, which change. However, depending on the gamma correction curves, there is a case where pixel values as the maximum value are inputted, but pixel values lower than the maximum value are outputted. Because the maximum value is not outputted, dots are generated in a solid letter region by the screen processing, and accordingly the solid letter is expressed as a letter having a halftone. Such a halftone region is not identified as a solid letter by the pattern matching of the smoothing processing, which is performed after the screen processing. Consequently, the smoothing processing is not performed.

Furthermore, in the smoothing processing, taking a letter having a gradation of a halftone close to a solid letter, namely, close to a gradation of the maximum value, as a target increases the image quality of the letter. However, similarly to the case described above, dots are generated in the letter having a gradation of such a halftone by the screen processing. Consequently, the smoothing processing is not performed.

For the reasons described above, there is no merit any longer in performing the smoothing processing after the screen processing. Rather, there is a case where image processing, the target for which is an edge, such as the smoothing processing, is better to be performed before the screen processing or the gamma correction processing so as to easily determine whether a letter is a solid letter or not.

In order to perform the edge processing, such as the smoothing processing, before the screen processing, a careful consideration is necessary for a region of a target (target region) for the screen processing. If the screen processing is performed on the whole region, the screen processing is performed on the whole edge too, the pixel values of which are finely adjusted by the edge processing. Consequently, effects of the edge processing cannot be obtained, or worse, the image quality may decrease. In order to avoid decrease of the image quality, and obtain the effects of the edge processing, as disclosed in Japanese Patent Application Laid-Open Publication No. 2005-341249 mentioned above, it is necessary to exclude the edge of a letter from a target for the screen processing, and perform the continuous tone processing thereon.

However, it does not mean that the image quality increases if the continuous tone processing is performed on the edge only, because the pixels having the pixel values adjusted by the edge processing are not limited to pixels (edge pixels) of the edge. If the continuous tone processing is performed on the edge only although there are other pixels (no-edge pixels) having the pixel values changed by the edge processing, the screen processing is performed on the no-edge pixels, and gradations of the no-edge pixels are expressed by dots. Consequently, an effect of the edge processing, namely, expressing detail, is weakened. Furthermore, in a case where an edge forms a step, the edge (edge pixels), on which the continuous tone processing has been performed, and the no-edge pixels, on which the screen processing has been performed, are located on a same line. Unless the no-edge pixels on which the screen processing has been performed are dotted, the contour enhanced by the continuous tone processing looks cut.

Furthermore, as is the case with the smoothing processing and the thinning processing, a plurality of types of the edge processing may be performed in parallel. In order to adjust their respective processing results, there is a case where not only pixels (edge pixels) of the edge but also pixels (adjacent pixels) adjacent to the edge pixels are processed. The adjacent pixels are, similarly to the case described above, not a target for the continuous tone processing although the pixel values thereof have been adjusted by the edge processing. Consequently, the screen processing is performed on the adjacent pixels, and hence the effects of the edge processing cannot be obtained.

BRIEF SUMMARY OF THE INVENTION

Objects of the present invention include obtaining the effects of the edge processing even when the gradation processing is performed after the edge processing.

In order to achieve at least one of the objects, according to a first aspect of the present invention, there is provided an image processing apparatus including: a first edge extraction unit which determines an edge pixel of image data constituting an edge of an object by using pixel values of pixels of the image data so as to extract the edge pixel as a first edge; an edge processing unit which performs edge processing on the image data so as to change a pixel value of an edge pixel constituting the edge of the object in the edge processing or a pixel value of an adjacent pixel to the edge pixel in an opposite edge direction; a second edge extraction unit which extracts the edge pixel or the adjacent pixel having the pixel value changed by the edge processing as a second edge; a third edge extraction unit which extracts the first edge and the second edge as a third edge; and a gradation processing unit which performs gradation processing on the image data on which the edge processing has been performed, wherein the gradation processing unit switches contents of the gradation processing on the basis of whether a pixel of the image data on which the edge processing has been performed is a third edge pixel constituting the third edge or a no-third edge pixel not constituting the third edge so as to enhance a third edge region of the third edge by the gradation processing as compared with a region other than the third edge region.

In order to achieve at least one of the objects, according to a second aspect of the present invention, there is provided an image processing method including: a first edge extraction step of determining an edge pixel of image data constituting an edge of an object by using pixel values of pixels of the image data so as to extract the edge pixel as a first edge; an edge processing step of performing edge processing on the image data so as to change a pixel value of an edge pixel constituting the edge of the object in the edge processing or a pixel value of an adjacent pixel to the edge pixel in an opposite edge direction; a second edge extraction step of extracting the edge pixel or the adjacent pixel having the pixel value changed by the edge processing as a second edge; a third edge extraction step of extracting the first edge and the second edge as a third edge; and a gradation processing step of performing gradation processing on the image data on which the edge processing has been performed, wherein in the gradation processing step, contents of the gradation processing are switched on the basis of whether a pixel of the image data on which the edge processing has been performed is a third edge pixel constituting the third edge or a no-third edge pixel not constituting the third edge so as to enhance a third edge region of the third edge by the gradation processing as compared with a region other than the third edge region.

BRIEF DESCRIPTION OF THE SEVERAL VIEWS OF THE DRAWING

The present invention is fully understood from the detailed description given hereinafter and the accompanying drawings, which are given by way of illustration only, and thus are not intended to limit the present invention, wherein:

FIG. 2 shows 7×7 pixels;

FIG. 3 shows examples of templates used for pattern matching in smoothing processing;

FIG. 15 shows an example of an operation screen related to settings of the edge processing and contour enhancement.

DETAILED DESCRIPTION OF THE INVENTION

Figure 1:
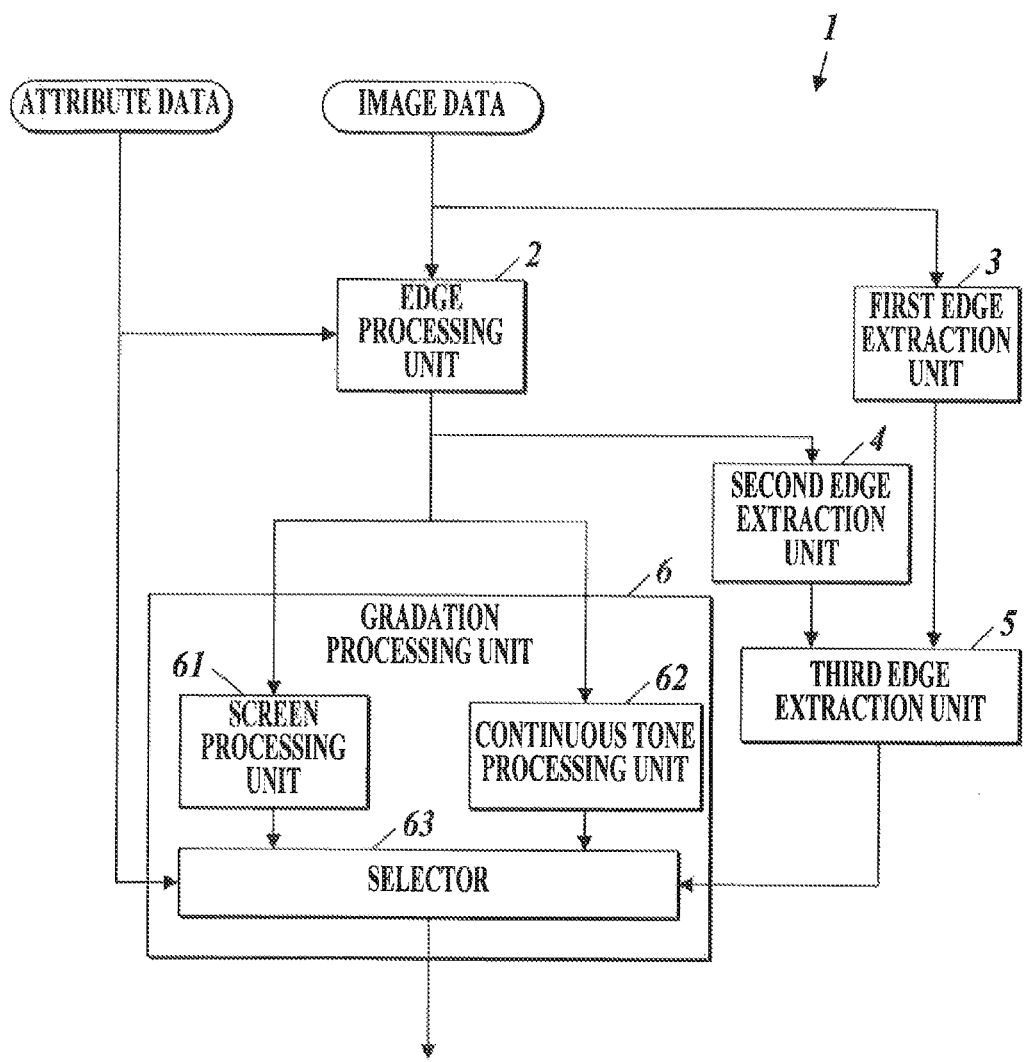
FIG. 1 is a block diagram of an image processing apparatus in accordance with an embodiment of the present invention.

In the following, embodiments of an image processing apparatus and an image processing method of the present invention are descried referring to the drawings.

First Embodiment

FIG. 1 shows an image forming apparatus 1 in accordance with an embodiment of the present invention.

The image forming apparatus 1 inputs into itself image data and attribute data thereof, and outputs an image on which edge processing and then gradation processing are performed. The attribute data is data indicating an attribute of a pixel of image data. Examples of the attribute include letters (Text), figures (Graphic) and pictures (Image).

As shown in FIG. 1, the image processing apparatus 1 includes an edge processing unit 2, a first edge extraction unit 3, a second edge extraction unit 4, a third edge extraction unit and a gradation processing unit 6.

The edge processing unit 2 performs the edge processing on image data. In the edge processing, the edge processing unit 2 changes pixel values of pixels (edge pixels) which constitute the edge of an object included in image data, or pixel values of pixels (adjacent pixels) which are adjacent to the edge pixels in an opposite edge direction. Objects are units of images each of which is constituted of pixels having the same attribute, such as Text, Graphic or Image. The opposite edge direction is a direction opposite to an edge direction, namely, a direction from a large pixel value to a small pixel value or a direction from a foreground to a background.

Examples of the edge processing include smoothing processing and thinning processing.

The smoothing processing is called anti-aliasing processing. The smoothing processing takes the edge of a slant part of an object as a target, and increases or reduces pixel values of edge pixels or pixel values of adjacent pixels to the edge pixels in the opposite edge direction so as to make the pixels halftones, whereby a slant looks smooth.

The thinning processing takes the edge of an object as a target, and adjusts pixel values of edge pixels to reproduce a sharp object. The thinning processing can realize not only thinning by reducing pixel values but also thickening by increasing pixel values.

In the following, contents of the smoothing processing and the thinning processing, which are performed by the edge processing unit 2 as the edge processing, are described in detail. However, the contents thereof are not limited thereto. That is, for example, even in the same edge processing, if the contents are different, pixels, the pixel values of which are changed, may be different.

In a case where the smoothing processing is performed as the edge processing, the edge processing unit 2 inputs into itself image data in units of 7×7 pixels (7×7 pixel units) centering on an attention pixel. The edge processing unit 2 calculates a difference between two pixels adjacent to each other in a 7×7 pixel unit, and if the difference is equal to or more than a threshold value, determines that the edge of an object exists in the two pixels, and if the difference is less than the threshold value, determines that the edge of an object does not exist in the two pixels. The edge processing unit 2 outputs an edge signal of 1 when determining that the edge exists, and outputs an edge signal of 0 when determining that the edge does not exist.

FIG. 2 shows a 7×7 pixel unit, namely, 49 pixels to which pixel identification numbers 01 to 49 are assigned, respectively. The pixel having the pixel identification number positioned at the center of the unit is the attention pixel.

In the following, examples of combinations of two pixels, the difference between which is calculated, are shown by using the pixel identification numbers.

03-10, 04-11, 05-12, 10-17, 10-18, 11-17, 11-18, 11-19, 12-18, 12-19, 15-16, 16-17, 16-24, 17-18, 17-23, 17-24, 18-19, 18-24, 18-25, 18-26, 19-25, 19-26, 19-27, 20-21, 20-26, 22-23, 23-24, 23-31, 24-25, 24-30, 24-31, 24-32, 25-26, 25-32, 26-27, 26-32, 26-33, 26-34, 27-28, 27-33, 29-30, 30-31, 31-32, 31-38, 31-39, 32-33, 32-38, 32-39, 32-40, 33-34, 33-39, 33-40, 34-35, 38-45, 39-46, 40-47

The edge processing unit 2 collates the outputted edge signals with respect to the 7×7 pixel unit with templates which are used to define a pattern of the edge, which is a target for the smoothing processing, so as to find a template which agrees with the 7×7 pixel unit. A target for the smoothing processing is the edge of an object, the edge having a slant structure. The templates are designed to be able to determine whether the attention pixel constitutes the edge, or is an adjacent pixel to the edge in the opposite edge direction.

Figure 3:
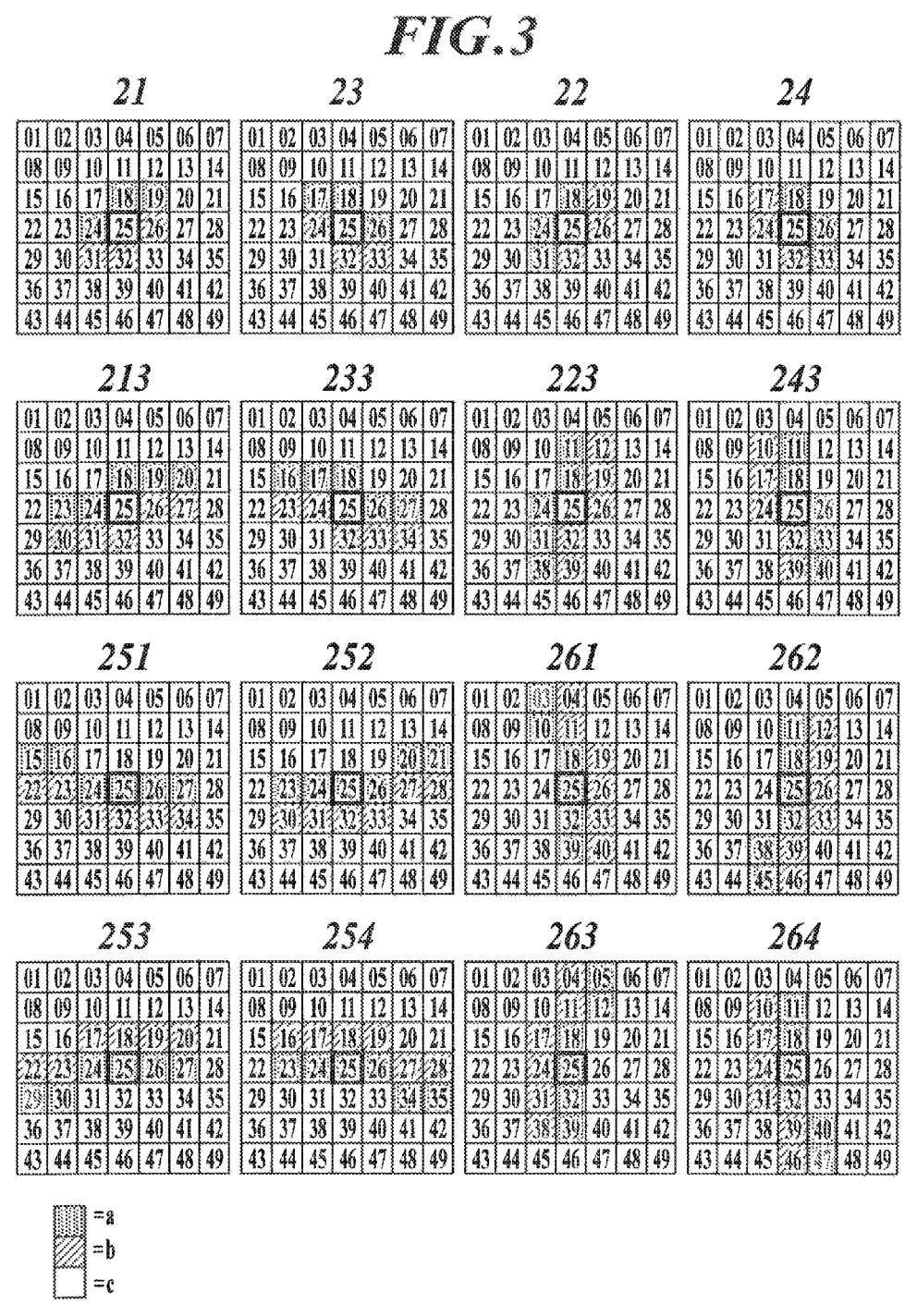

FIG. 3 shows examples of the templates. In FIG. 3, a number above each template indicates a template identification number.

As shown in FIG. 3, pixels on each template are classified into a, b and c. If edge signals between pixels of a 7×7 pixel unit classified into a on a template are 0, edge signals between pixels of the 7×7 pixel unit classified into b are 0, and edge signals between pixels of the 7×7 pixel unit classified into a and b are 1, the edge processing unit 2 determines that the 7×7 pixel unit agrees with the template. Pixels of a 7×7 pixel unit classified into c are not cared to determine whether or not an edge exists. Not one but two or more templates may agree with a 7×7 pixel unit. The edge processing unit 2 collates a 7×7 pixel unit with all the templates so as to detect all templates which agree with the 7×7 pixel unit. As long as at least one template agrees with a 7×7 pixel unit, the attention pixel of the 7×7 pixel unit is a target for the smoothing processing.

If no template agrees with a 7×7 pixel unit, the attention pixel of the 7×7 pixel unit is not a target for the smoothing processing.

The templates shown in FIG. 3 have priorities. The edge processing unit 2 selects one template having the highest priority according to the priorities of the templates from among one or more template which agrees with a 7×7 pixel unit. The templates 24, 23, 22, 21, 233, 213, 243, 223, 252, 251, 254, 253, 262, 261, 264 and 263 have higher priorities in the order named.

The edge processing unit 2 calculates a change amount dSMT of the pixel value of the attention pixel, the change amount dSMT being produced by the smoothing processing, by using the pixel values of the pixels classified into a and b on the selected one template.

The change amount dSMT is calculated by the following equations. In the equations, C represents the pixel value of a pixel having a pixel identification number shown in [ ]. The C[25] represents the pixel value of the attention pixel.

<For Selected One Template Having Template Identification Number 21, 22, 23 or 24>

$dSMT=(C[18]+C[25]+C[32])/3-C[25]$

<For Selected One Template Having Template Identification Number 213 or 233>

$dSMT=(C[18]\times2+C[25]+C[32]\times2)/5-C[25]$

<For Selected One Template Having Template Identification Number 223 or 243>

$dSMT=(C[24]\times2+C[25]+C[26]\times2)/5-C[25]$

<For Selected One Template Having Template Identification Number 251 or 252>

$dSMT=(C[25]\times4+C[32])/5-C[25]$

<For Selected One Template Having Template Identification Number 253 or 254>

$dSMT=(C[25]\times4+C[18])/5-C[25]$

<For Selected One Template Having Template Identification Number 261 or 262>

$dSMT=(C[25]\times4+C[26])/5-C[25]$

<For Selected One Template Having Template Identification Number 263 or 264>

$dSMT=(C[25]\times4+C[24])/5-C[25]$

The edge processing unit 2 adds the calculated change amount dSMT to the pixel value of the attention pixel so as to obtain a smoothed pixel value (edge-processed pixel value) of the attention pixel on which the smoothing processing has been performed.

The edge processing unit 2 performs the above processing taking each of the pixels of image data as the attention pixel, and outputs image data constituted of the smoothed pixel values.

Next, the thinning processing performed by the edge processing unit 2 as the edge processing is described.

The edge processing unit 2 inputs into itself image data in units of 3×3 pixels (3×3 pixel units) centering on the attention pixel.

The edge processing unit 2 calculates edge strength of the attention pixel by using the pixel values of the attention pixel and eight pixels (surrounding pixels) which surround the attention pixel.

The edge processing unit 2 calculates differences between the pixel value of the attention pixel and the pixel values of the eight surrounding pixels as edge strength E0 to E7. In the case of a 3×3 pixel unit centering on the pixel 25 shown in FIG. 2, the edge strength E0 to E7 are calculated by the following equations. In the equations, C represents the pixel value of a pixel having a pixel identification number shown in [ ].

$E0=C[25]-C[17]$ $E1=C[25]-C[18]$ $E2=C[25]-C[19]$ $E3=C[25]-C[24]$ $E4=C[25]-C[26]$ $E5=C[25]-C[31]$ $E6=C[25]-C[32]$ $E7=C[25]-C[33]$

The edge processing unit 2 finds the maximum value among the edge strength E0 to E7 as edge strength PED. In addition, the edge processing unit 2 reverses the positive and the negative of the edge strength E0 to E7, and then finds the maximum value among the edge strength E0 to E7 as edge strength RED. The edge processing unit 2 corrects PED to 0 if PED<RED, and corrects RED to 0 if RED<PED.

In a case where image data is image data of a color image constituted of a plurality of colors, the edge processing unit 2 calculates TPED and TRED by the following equations using PED and RED obtained from respective color image data. If the image data is constituted of four color image data, namely, cyan (C) image data, magenta (M) image data, yellow (Y) image data and black (K) image data, TPED and TRED are calculated by the following equations, respectively.

$TPED=(PED[c]\times Wc+PED[m]\times Wm+PED[y]\times Wy+PED[k]\times Wk)$ $TRED=(RED[c]\times Wc+RED[m]\times Wm+RED[y]\times Wy+RED[k]\times Wk)$ In the above equations, PED and RED are respectively PED and RED obtained from cyan image data, magenta image data, yellow image data or black image data, which is indicated in [ ] with c (cyan), m (magenta), y (yellow) or k (black). In addition, in the above questions, Wc, Wm, Wy and Wk are predetermined coefficients, and We+Wm+Wy+Wk≤255.

In a case where image data is image data of a monochrome image constituted of one color, TPED and TRED are calculated by the following equations, respectively.

$TPED=PED[k]\times Wk$ $TRED=RED[k]\times Wk$

TPED represents a value obtained by weighting the edge strength PED of the colors by the coefficients Wc, Wm, Wy and Wk which correspond to luminosity function, and summing up the weighted edge strength PED of the colors. TRED represents a value obtained by weighting the edge strength RED of the colors by the coefficients Wc, Wm, Wy and Wk which correspond to luminosity function, and summing up the weighted edge strength RED of the colors. TPED and TRED can be indicators of a visual density of the color image data being superposed on top of each other. Because a target for the thinning processing is the edge of a foreground, the edge processing unit 2 can determine which of the attention pixel and the surrounding pixels is a foreground (or a background) by determining which of TPED and TRED is larger.

The edge processing unit 2 determines that the attention pixel constitutes the edge of a foreground, which has a higher density than that of a background, if TPED>TRED, and determines that the attention pixel does not constitute the edge of a foreground if TPED≤TRED.

The edge processing unit 2 compares the pixel value of the attention pixel, which is determined as the edge of a foreground, with a threshold value so as to determine whether or not the attention pixel has a pixel value high enough to undergo the thinning processing. If the attention pixel does not have such a pixel value, but undergoes the thinning processing, the pixel value is reduced by the thinning processing and becomes a very low value or 0. Consequently, a cut is generated in an image. In order to avoid such a situation, the attention pixel not having such a pixel value is excluded from a target for the thinning processing.

The edge processing unit 2 calculates a change amount dST of the pixel value of the attention pixel, the change amount dST being produced by the thinning processing, by using the attention pixel which constitutes the edge of a foreground, and has a pixel value being equal to or more than the threshold value. The change amount dST is calculated for each color by the following equation in which the edge strength PED and the edge strength PED for the color are used.

$$dST=(PED-RED) \times STVL$$

In the above equation, the STVL is a coefficient indicating strength of the thinning processing, and is determined for each color. The STVL is a linear function which outputs an output value within a range of −1 to 1 according to the pixel value of the attention pixel. For example, STVL with dST<0 is represented by the following equation.

$$STVL=-(a \times C[25]+b)$$

The a and b in the above equation are coefficients, and can be set properly in accordance with desirable strength of the thinning processing. The larger the a and b are, the higher the strength of the thinning processing becomes. In other words, the smaller the a and b are, the lower the strength of the thinning processing is.

The edge processing unit 2 adds the calculated change amount dST to the pixel value of the attention pixel so as to obtain a thinned pixel value (edge-processed pixel value) of the attention pixel on which the thinning processing has been performed. If STVL, which indicates the strength of the thinning processing, is a negative value, dST is also a negative value, so that the pixel value of the attention pixel is reduced, and accordingly the thinning of the thinning processing is performed. On the other hand, if STVL is a positive value, dST is also a positive value, so that the pixel value of the attention pixel is increased, and accordingly the thickening of the thinning processing is performed.

The edge processing unit 2 performs the above processing taking each of the pixels of image data as the attention pixel, and outputs image data constituted of the thinned pixel values.

The first edge extraction unit 3 determines pixels (edge pixels) constituting the edge of an object by using the pixel values of pixels of image data, and outputs the pixels determined as the edge as a first edge.

In addition, the first edge extraction unit 3 determines the edge directions of the pixels determined as the edge, and outputs the determined edge directions with the first edge. The edge direction is, as described above, a direction from a small pixel value to a large pixel value or a direction from a background to a foreground.

The first edge extraction unit 3 inputs into itself image data in units of 3×3 pixels (3×3 pixel units) centering on the attention pixel, and calculates differences SP between the pixel value of the attention pixel and the pixel values of the eight surrounding pixels. In the case of a 3×3 pixel unit centering on the pixel 25 shown in FIG. 2, the differences SP are calculated by the following equations. In the equations, C represents the pixel value of a pixel having a pixel identification number shown in [ ].

$$SP[u]=C[25]-C[18]$$

$$SP[l]=C[25]-C[24]$$

$$SP[r]=C[25]-C[26]$$

$$SP[d]=C[25]-C[32]$$

The first edge extraction unit 3 determines an edge direction x of the attention pixel in the main-scanning direction from the differences SP[l] and SP[r], which are differences between the attention pixel and the surrounding pixels positioned in the main-scanning direction. If SP[l]<SP[r], the first edge extraction unit 3 outputs x=−1, which indicates the left direction, as the edge direction x. If SP [l]>SP[r], the first edge extraction unit 3 outputs x=+1, which indicates the right direction, as the edge direction x. If SP [l]=SP[r], the first edge extraction unit 3 outputs x=0 as the x direction.

Similarly, the first edge extraction unit 3 determines an edge direction y of the attention pixel in the sub-scanning direction from the differences SP[u] and SP[d], which are differences between the attention pixel and the surrounding pixels positioned in the sub-scanning direction. If SP[u]<SP[d], the first edge extraction unit 3 outputs y=+1, which indicates the up direction, as the edge direction y. If SP[u]>SP[d], the first edge extraction unit 3 outputs y=−1, which indicates the down direction, as the edge direction y. If SP [u]=SP[d], the first edge extraction unit 3 outputs y=0 as the edge direction y.

Figure 4:
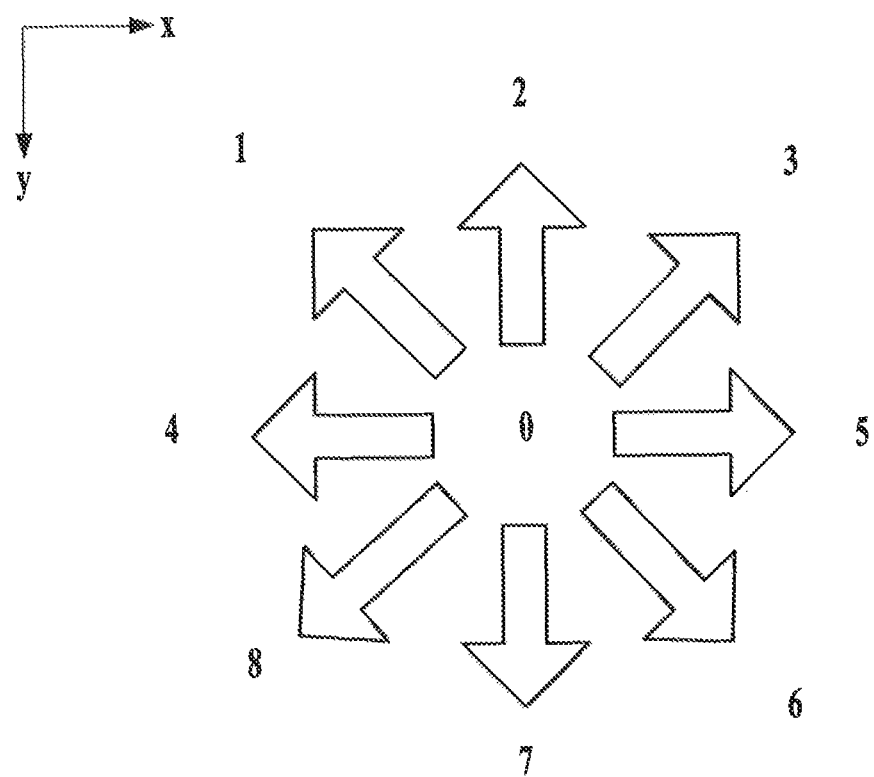
FIG. 4 shows an edge direction indicated by values of P.

The first edge extraction unit 3 determines that the attention pixel does not constitute the edge of an object if x=y=0 holds, and outputs P=0 as an edge direction P. The first edge extraction unit 3 determines that the attention pixel constitutes the edge of an object if x=y=0 does not hold, and determines the edge direction P on the basis of a combination of x and y as shown below. FIG. 4 shows the edge direction P indicated by values of P.

If X=−1 and Y=+1, P=1.
If X=0 and Y=+1, P=2.
If X=+1 and Y=+1, P=3.
If X=−1 and Y=0, P=4.
If X=+1 and Y=0, P=5.
If X=+1 and Y=−1, P=6.
If X=0 and Y=−1, P=7.
If X=−1 and Y=−1, P=8.

The first edge extraction unit 3 repeats the above processing so as to determine whether or not each pixel of image data constitutes the edge of an object, and determine the edge direction P when determining that the pixel constitutes the edge.

The second edge extraction unit 4 extracts and outputs, among the pixels of the image data, pixels having the pixel values changed by the edge processing performed by the edge processing unit 2 as a second edge.

The second edge extraction unit 4 may compare the original image data with the image data obtained by the edge processing performed by the edge processing unit 2 so as to extract the pixels having pixel values changed by the edge processing as the second edge, or may obtain the change amounts dST or dSMT produced by the edge processing performed by the edge processing unit 2 so as to extract the pixels having dST≠0 or dSMT≠0 as the second edge.

The third edge extraction unit 5 adds the second edge, which is extracted by the second edge extraction unit 4, to the first edge, which is extracted by the first edge extraction unit 3, and outputs the first edge and the second edge as a third edge. Because a pixel may constitute the first edge and the second edge, the third edge extraction unit 5 extracts a logical sum of the first edge and the second edge as the third edge.

The third edge extraction unit 5 inputs into itself the edge direction P of each pixel (third edge pixel) of the third edge from the first edge extraction unit 3, and outputs information on the third edge and the edge directions P to the gradation processing unit 6.

The gradation processing unit 6 switches contents (types) of gradation processing on the basis of determination whether or not each pixel of the image data obtained by the edge processing constitutes the third edge extracted by the third edge extraction unit 5 so as to enhance a region of the third edge (a third edge region) having undergone the gradation processing as compared with a region other than the third edge region (the other region).

The gradation processing unit 6 includes a screen processing unit 61 and a continuous tone processing unit 62. The screen processing unit 61 performs screen processing as the gradation processing. The continuous tone processing unit 62 performs continuous tone processing as the gradation processing. The gradation processing unit 6 also includes a selector 63 which selects and outputs a result of the processing by the screen processing unit 61 or a result of the processing by the continuous tone processing unit 62 for each pixel of the image data.

The screen processing unit 61 collates a threshold value matrix, in which threshold values are determined for pixels, respectively, with the image data on a pixel-to-pixel basis, and makes the pixel values of the pixels of the image data binarized or multivalued in accordance with the threshold values of the threshold value matrix, the threshold values being respectively for the pixels, so as to output the binarized or multivalued pixel values.

The continuous tone processing unit 62 outputs image data inputted thereto as it is. The continuous tone processing unit 62 does not perform any processing on image data inputted thereto, and outputs the pixel values of the pixels of the inputted image data as they are.

The selector 63 switches the contents of the gradation processing on the basis of whether or not each pixel of the image data constitutes the third edge outputted by the third edge extraction unit 5. The selector 63 selects and outputs the image data outputted from the continuous tone processing unit 62 with respect to the pixels (third edge pixels) determined as the third edge, and selects and outputs the image data outputted from the screen processing unit 61 with respect to the pixels (no-third edge pixels) determined as no third edge.

The selector 63 can perform the above-described switch of the contents of the gradation processing in accordance with the attribute data. For example, if a target for the edge processing unit 2 is the attribute Text, the selector 63 selects the image data outputted from the continuous tone processing unit 62 only when the attribute data of the pixel determined as the third edge indicates the attribute Text, and selects the image data outputted from the screen processing unit 61 when the attribute data of the pixel determined as the third edge indicates the attribute Image or the attribute Graphic.

Contents of processing performed by the image processing apparatus 1 are described in detail by using image examples.

In the following, a pixel value is indicated by percentage (%) with respect to a value range of pixel values. For example, if the value range of pixel values is from 0 to 255, a pixel value of 50% indicates a pixel value of 128.

Figure 5A:
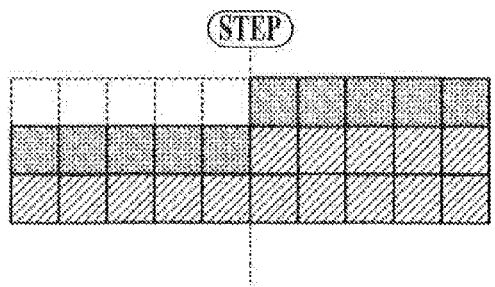
FIG. 5A shows a target region for continuous tone processing in a case where a target for the continuous tone processing is only a first edge in an image of an object having a step.
Figure 5B:
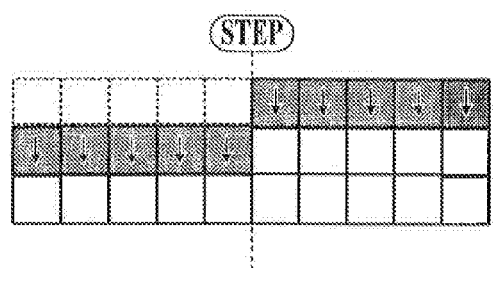
FIG. 5B shows the first edge of the image shown in FIG. 5A.

FIG. 5A shows a part of an image of an object having a step structure. The pixel values of pixels of the object are 100%, namely, the maximum value, and the pixel values of pixels of the background are 0%, namely, the minimum value. FIG. 5B shows the first edge in a case where pixels at the outermost of the object are determined as the edge of the object. If a target for the continuous tone processing is only the first edge, as shown in FIG. 5A, the continuous tone processing is performed on the pixels of the first edge so as to enhance the first edge as compared with the other region, on which the screen processing is performed. However, because of the step, the pixels on which the continuous tone processing has been performed and the pixels on which the screen processing has been performed are positioned on the same line in the main-scanning direction, so that the enhanced contour looks cut.

Figure 5C:
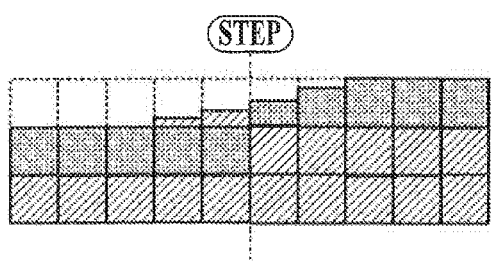
FIG. 5C shows an image obtained by performing the smoothing processing on the image shown in FIG. 5A.

FIG. 5C shows an image obtained by performing the smoothing processing on the image shown in FIG. 5A. By the smoothing processing, the pixel values of pixels of the first edge and the pixel values of adjacent pixels to the first edge in the opposite edge direction near the step are changed, so that the step is expressed with a gentle slope. If a target for the continuous tone processing is only the first edge shown in FIG. 5B, as shown in FIG. 5C, the screen processing is performed on the pixels which have the pixel values changed by the smoothing processing, but do not constitute the first edge. There is no guarantee that the pixels on which the screen processing is performed are dotted, and even when the pixels are dotted, the sizes of the dots do not always correctly reflect the pixel values of the pixels finely adjusted by the smoothing processing. Hence, there is a high possibility that detail of the image having the gentle slope is not reproduced.

Figure 5D:
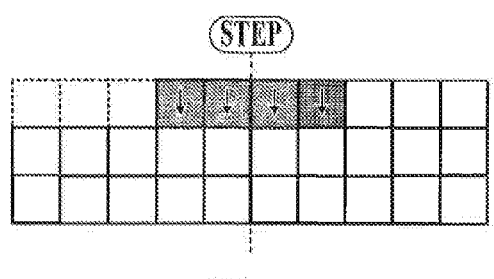
FIG. 5D shows a second edge in the image shown in FIG. 5C.
Figure 5E:
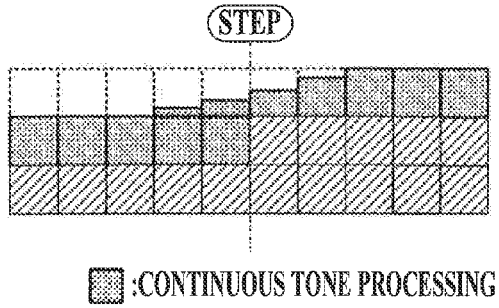
FIG. 5E shows a target region for the continuous tone processing in a case where a logical sum of the first edge and the second edge is a third edge.
Figure 5F:
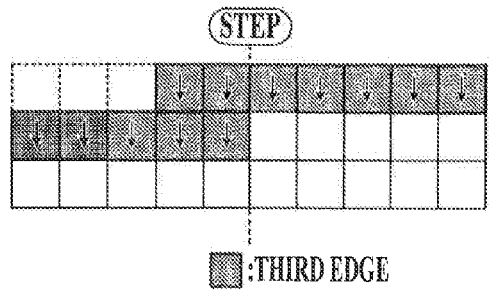
FIG. 5F shows the third edge which is a logical sum of the first edge shown in FIG. 5B and the second edge shown in FIG. 5D.

However, according to the embodiment, the pixels having the pixel values changed by the smoothing processing are extracted as the second edge by the second edge extraction unit 4 as shown in FIG. 5D, so as to be added to the third edge. By making the third edge a target for the continuous tone processing, as shown in FIG. 5E, a target region for the continuous tone processing is expanded to the pixels which do not constitute the first edge, but have the pixel values changed by the smoothing processing, so that the sizes of dots reflect the pixel values finely adjusted by the smoothing processing as they are. FIG. 5F shows the third edge obtained as a logical sum of the first edge shown in FIG. 5B and the second edge shown in FIG. 5D.

As described above, according to the embodiment, the image processing apparatus 1 includes: the first edge extraction unit 3, which determines a pixel (edge pixel) of image data constituting the edge of an object by using pixel values of pixels of the image data so as to extract the pixel as the first edge; the edge processing unit 2, which performs the edge processing on the image data so as to change the pixel value of a pixel (edge pixel) constituting the edge of the object in the edge processing or the pixel value of an adjacent pixel to the pixel in the opposite edge direction; the second edge extraction unit 4, which extracts the pixel having the pixel value changed by the edge processing as the second edge; the third extraction unit 5, which extracts the first edge and the second edge as the third edge; and the gradation processing unit 6, which performs the gradation processing on the image data on which the edge processing has been performed. The gradation processing unit 6 switches contents of the gradation processing on the basis of whether a pixel of the image data on which the edge processing has been performed constitutes the third edge or not, namely, whether the pixel is the third edge pixel or the no-third edge pixel, so as to enhance the third edge region by the gradation processing as compared with the other region.

The gradation processing is the continuous tone processing or the screen processing. The gradation processing unit 6 outputs, with respect to the third edge pixels, pixel values (continuous-toned pixel values) on which the continuous tone processing has been performed, and with respect to the no-third edge pixels, pixel values (screened pixel values) on which the screen processing has been performed.

Accordingly, in addition to the pixel values of the edge of an object, the pixel values of pixels, the pixel values changed by the edge processing, can be outputted as they are by the continuous tone processing, so that the region (the third edge region) can be enhanced as compared with the region where the screen processing has been performed. By the enhancement, detail of an image formed by the edge processing can be reproduced. Therefore, even when the gradation processing is performed after the edge processing, the effects of the edge processing can be obtained.

Second Embodiment

In the first embodiment, the image processing apparatus 1 performs either the thinning processing or the smoothing processing as the edge processing. However, the image processing apparatus 1 may perform both the thinning processing and the smoothing processing as the edge processing.

Figure 6:
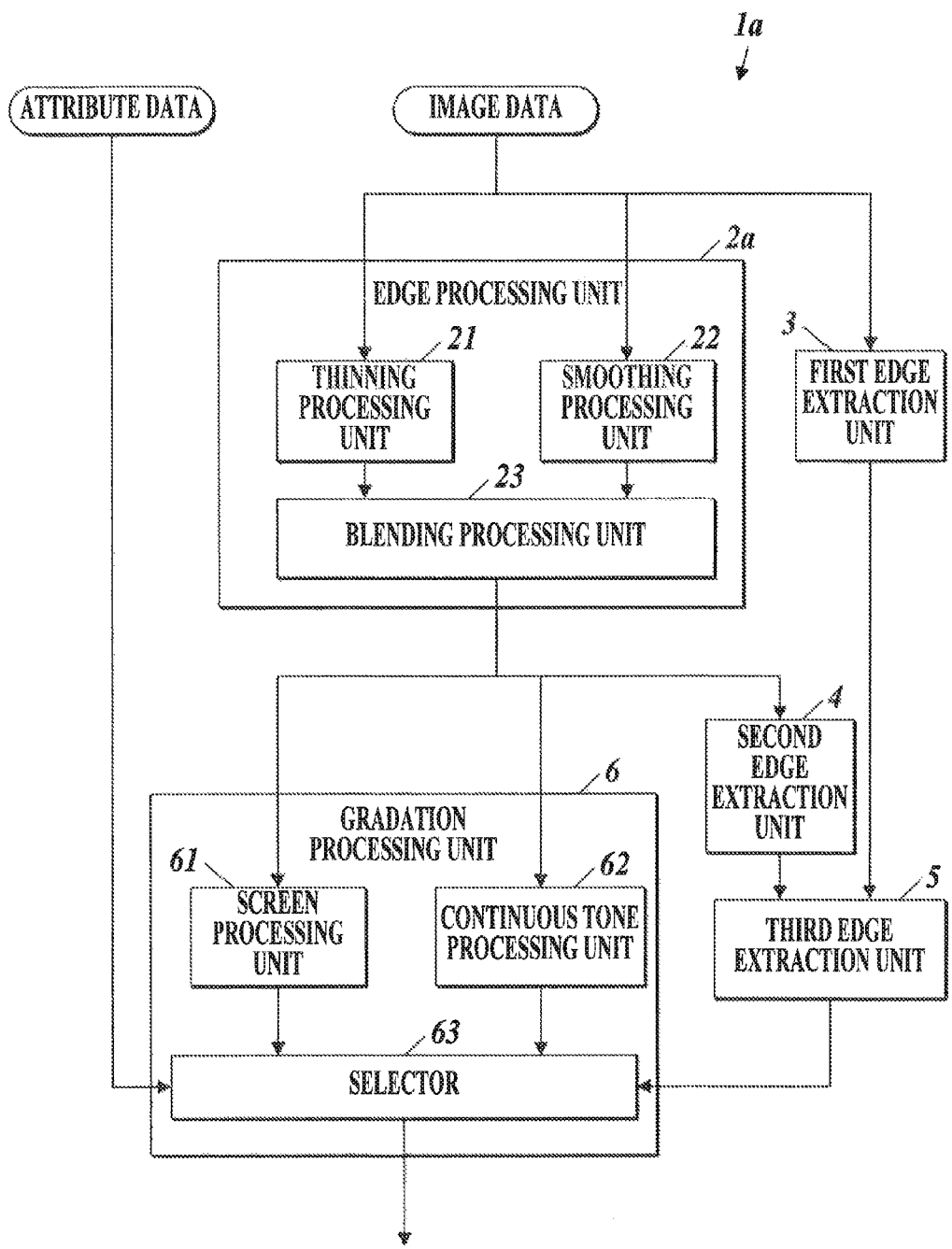
FIG. 6 is a block diagram of an image processing apparatus in accordance with an embodiment of the present invention, the image processing apparatus which performs thinning processing and the smoothing processing in parallel as edge processing.

FIG. 6 shows an image processing apparatus 1a including an edge processing unit 2a which performs both the thinning processing and the smoothing processing. Of the image processing apparatus 1a, the components which are the same as those of the image processing apparatus 1 are denoted by the same reference numbers, and detailed description thereof is omitted.

The edge processing unit 2a includes a thinning processing unit 21, a smoothing processing unit 22 and a blending processing unit 23.

The thinning processing unit 21 performs the thinning processing on image data, and calculates the change amount dST of the pixel value of each pixel of the image data, the change amount dST being produced by the thinning processing. The content of the thinning processing is the same as that described in the first embodiment, and hence detailed description thereof is omitted.

The smoothing processing unit 22 performs the smoothing processing on the image data, and calculates the change amount dSMT of the pixel value of each pixel of the image data, the change amount dSMT being produced by the smoothing processing. The content of the smoothing processing is the same as that described in the first embodiment, and hence detailed description thereof is omitted.

The blending processing unit 23 decides the pixel value of each pixel obtained when both the thinning processing and the smoothing processing are performed on image data by using the change amount dST calculated by the thinning processing unit 21 and the change amount dSMT calculated by the smoothing processing unit 22.

In the following, how the blending processing unit 23 decides the pixel value is described. However, this is just an example, and hence a method for deciding the pixel value is not limited thereto.

If both the change amounts dST and dSMT of the attention pixel are not 0, and accordingly the pixel value of the attention pixel is changed by both the thinning processing and the smoothing processing, the blending processing unit 23 adds the changed amounts dST and dSMT to the original pixel value of the attention pixel. The blending processing unit 23 outputs the obtained pixel value as a pixel value (edge-processed pixel value) of the attention pixel obtained when both the thinning processing and the smoothing processing are performed thereon.

If the change amount dST of the attention pixel is not 0, and the change amount dSMT thereof is 0, and accordingly the pixel value of the attention pixel is changed by the thinning processing only, the blending processing unit 23 adds the changed amount dST to the original pixel value of the attention pixel.

When only the thinning processing is performed on the attention pixel, it is assumed that the smoothing processing is performed on an adjacent pixel to the attention pixel in the edge direction P or an opposite edge direction Pa. The opposite edge direction Pa is a direction opposite to the edge direction P. Hence, when the smoothing processing is performed on the adjacent pixel in the edge direction P or the opposite edge direction Pa, the blending processing unit 23 adds the change amount dSMT of the adjacent pixel, the change amount dSMT being produced by the smoothing processing, to the pixel value of the attention pixel. Accordingly, a change amount of a pixel value by the thinning processing and the smoothing processing can be adjusted with two pixels, namely, the attention pixel and the adjacent pixel.

More specifically, if the change amount dST of the adjacent pixel to the attention pixel in the edge direction P is 0, and the change amount dSMT thereof is not 0, and accordingly the smoothing processing is performed on the adjacent pixel, the blending processing unit 23 additionally adds the change amount dSMT of the adjacent pixel, which is adjacent to the pixel value of the attention pixel in the edge direction P, to the pixel value of the attention pixel. If the change amount dST of the adjacent pixel to the attention pixel not in the edge direction P but in the opposite edge direction Pa is 0, and the change amount dSMT thereof is not 0, the blending processing unit 23 additionally adds the change amount dSMT of the adjacent pixel, which is adjacent to the pixel value of the attention pixel in the opposite edge direction Pa, to the pixel value of the attention pixel.

If the change amount dST of the attention pixel is 0, and the change amount dSMT thereof is not 0, and accordingly the pixel value of the attention pixel is changed by the smoothing processing only, the blending processing unit 23 adds the change amount dSMT to the original pixel value of the attention pixel.

When only the smoothing processing is performed on the attention pixel, it is assumed that the thinning processing is performed on an adjacent pixel to the attention pixel in the edge direction P or the opposite edge direction Pa. Hence, when the thinning processing is performed on the adjacent pixel in the edge direction P or the opposite edge direction Pa, the blending processing unit 23 adds the change amount dST of the adjacent pixel, the change amount dST being produced by the thinning processing, to the pixel value of the attention pixel. Accordingly, a pixel value can be adjusted with two pixel values, namely, the attention pixel and the adjacent pixel.

If both the change amounts dST and dSMT of the attention pixel are 0, and accordingly the pixel value of the attention pixel is not changed by the thinning processing or the smoothing processing, the blending processing unit 23 outputs the original pixel value of the attention pixel.

The second edge extraction unit 4 compares the pixel value of each pixel outputted from the blending processing unit 23 with the original pixel value of the pixel of the image data, so as to identify the pixels having the changed pixel values, and outputs the identified pixels as the second edge.

Because the second edge is outputted as the third edge by the third edge extraction unit 5, the thinning processing and the smoothing processing are performed on the second edge in parallel as the edge processing, and the adjusted pixel values of the second edge can be outputted by the continuous tone processing. Accordingly, as is the case with the first embodiment, even when the gradation processing is performed after the edge processing, the effects of the edge processing can be obtained.

Third Embodiment

In the first embodiment and the second embodiment, the continuous tone processing is performed on the first edge and the second edge as the third edge, so that the third edge region is enhanced as compared with the other region, on which the screen processing is performed. However, there is a case where the region (third edge region), on which the continuous tone processing is performed is partly small (narrow), so that a cut is generated in an image.

By the continuous tone processing, with respect to the first edge and the second edge (the third edge), the edge-processed pixel values, on which the edge processing has been performed, are outputted as they are. However, with respect to a portion of the third edge, the portion in which pixels (third edge pixels) are adjacent in the edge direction, the total of the continuous-toned pixel values thereof outputted by the continuous tone processing is large. In the image shown in FIG. 5E, before and after the step, the third edge region is changed from a portion where the total of the continuous-toned pixel values of two pixels, which are adjacent in the edge direction, is more than 100% to a portion where the continuous-toned pixel value of one pixel is around 50%, so that the third edge region where the continuous tone processing has been performed is partly narrow (thin). If printing is performed in this state, the third edge region enhanced by the continuous tone processing tends to look cut. Furthermore, depending on printing characteristics, if rapid change of pixel values from a large value to a small value occurs, toner could not be outputted for the amount needed for each pixel value during printing, so that a cut could be generated in an image.

In order to prevent such a cut from being generated, it is preferable that the third edge extraction unit 5 extracts adjacent pixels to the second edge in the edge direction P as the third edge in addition to the first edge and the second edge.

Figure 7A:
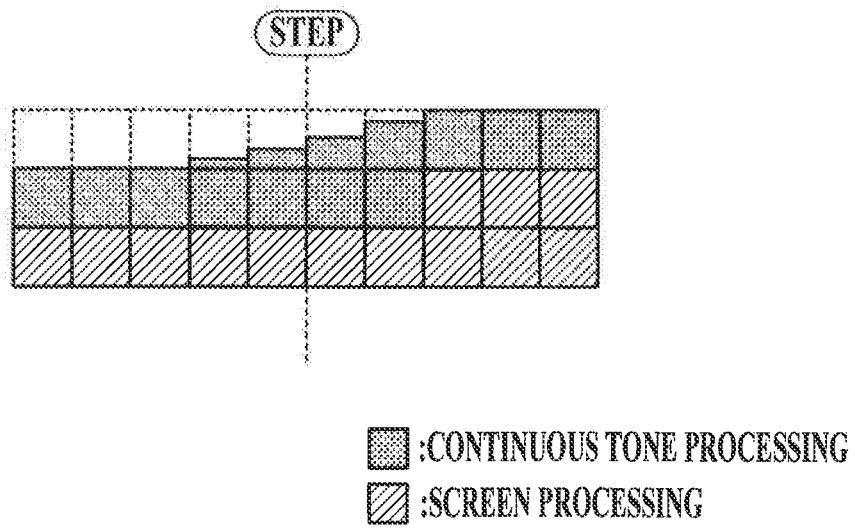
FIG. 7A shows a target region for the continuous tone processing in a case where adjacent pixels to the second edge in the edge direction are added to the third edge in the image shown in FIG. 5E.
Figure 7B:
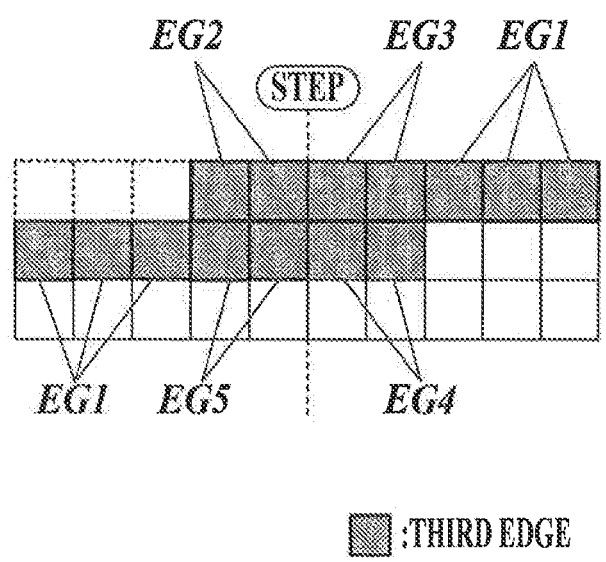
FIG. 7B shows the third edge in the case where the adjacent pixels to the second edge in the edge direction are added to the third edge shown in FIG. 5F.

In the image shown in FIG. 5E, a logical sum of the first edge shown in FIG. 5B and the second edge shown in FIG. 5D is extracted as the third edge. Because the edge direction P of the second edge is the down direction indicated by P=7, the third edge extraction unit 5 extracts four adjacent pixels to the four pixels of the second edge in the down direction as the third edge. Among the four adjacent pixels, two adjacent pixels constitute the first edge too. Hence, the third edge extraction unit 5 extracts a logical sum of the first edge, the second edge and the adjacent pixels to the second edge in the edge direction P as the third edge. Consequently, as shown in FIG. 7A, a target for the continuous tone processing is expanded to the adjacent pixels to the second edge in the edge direction P. FIG. 7B shows the extracted third edge. As shown in FIG. 7A, the continuous-toned pixel values of the third edge in the edge direction P are 100% or more by one pixel or the total of two pixels. Accordingly, the cut described above can be prevented from being generated.

Fourth Embodiment

As is the case with the third embodiment, as the number of pixels extracted as the third edge increases, and accordingly a target region (third edge region) for the continuous tone processing expands, the region on which the continuous tone processing has been performed may be partly wide (thick or fat). In the image shown in FIG. 7A, while there is a portion where the continuous-toned pixel value of the third edge in the edge direction is around 100% by the continuous-toned pixel value of one third edge pixel or the total of the continuous-toned pixel values of two third edge pixels, there is a portion where the continuous-toned pixel value of the third edge in the edge direction is nearly 200% by the total of the continuous-toned pixel values of two third edge pixels. The portion having nearly 200% of the continuous-toned pixel value looks fat when printed. Furthermore, depending on printing characteristics, if large pixel values continuously exist, toner tends to be outputted for more than the amount needed for each pixel value during printing, so that the fatness easily occurs.

In order to prevent such fatness from occurring, it is preferable that the gradation processing unit 6 adjust, of the third edge (third pixel values), the total of the continuous-toned pixel values of the third edge pixels adjacent in the edge direction to a predetermined value. The predetermined value can be set appropriately, but it is preferable to be a value obtained by multiplying the original pixel value of an object by the number of pixels in the edge direction enhanced by the continuous tone processing. By using such a predetermined value, the width of the third edge in the edge direction enhanced by the continuous tone processing can be adjusted in pixels.

Figure 8A:
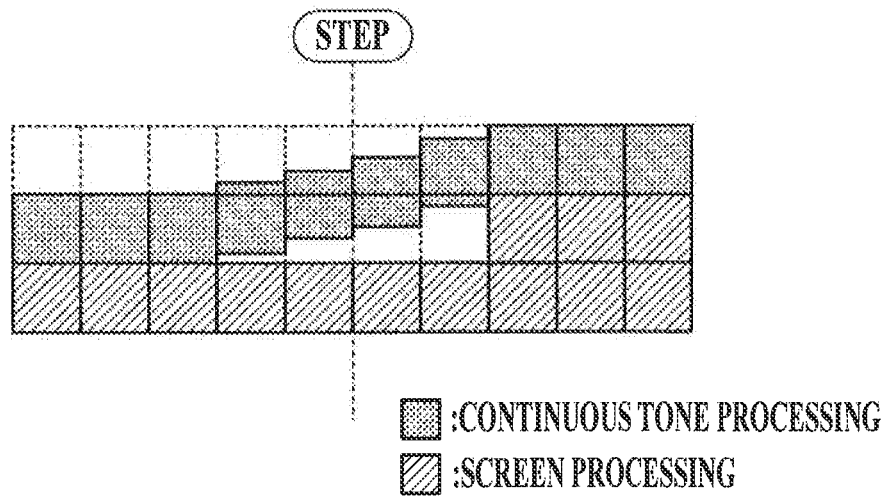
FIG. 8A shows an image obtained by, after the smoothing processing, adjusting the total of continuous-toned pixel values of third edge pixels of the third edge adjacent in the edge direction to a pixel value for one pixel of the object, the continuous-toned pixel values on which the continuous tone processing has been performed.
Figure 8B:
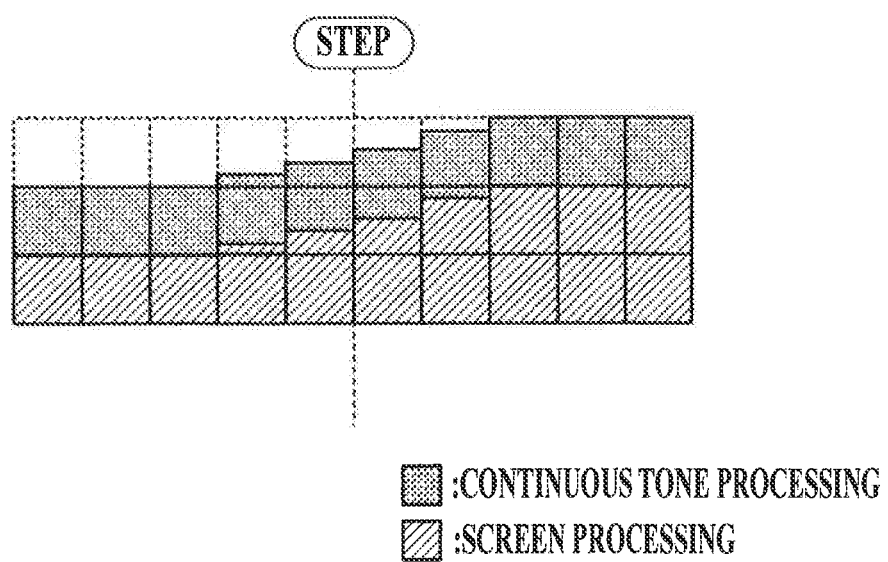
FIG. 8B shows an image obtained by performing the screen processing on the pixel values on which the continuous tone processing has not been performed at the time of the adjustment of the pixel values shown in FIG. 8A.

In the image shown in FIG. 7A, there is a portion where two third edge pixels are adjacent in the edge direction in the third edge, which is a target for the continuous tone processing. The total of the continuous-toned pixel values thereof is more than 100%. If the width of the third edge in the edge direction enhanced by the continuous tone processing is a width of one pixel, because the original pixel value of the object is 100%, the predetermined value as a target value for the adjustment is one pixel×100%=100%. The gradation processing unit 6 performs the continuous tone processing on the whole or a part of the pixel values of the two third edge pixels adjacent in the edge direction so as to adjust the total of the continuous-toned pixel values of the two third edge pixels to 100%. FIG. 8A shows the adjusted image. As shown in FIG. 8A, the continuous tone processing is performed on two third edge pixels adjacent in the edge direction. However, the total of the continuous-toned pixel values of the two third edge pixels is adjusted to 100%. Consequently, the partial fatness is solved.

However, the pixel having a part of the pixel value on which the continuous tone processing is performed may lose the remaining pixel value as shown in FIG. 8A, and accordingly a phenomenon called "whited out" may occur. In order to prevent such a phenomenon from occurring, it is preferable to perform the screen processing on the remaining pixel value, on which the continuous tone processing is not performed.

Figure 9:
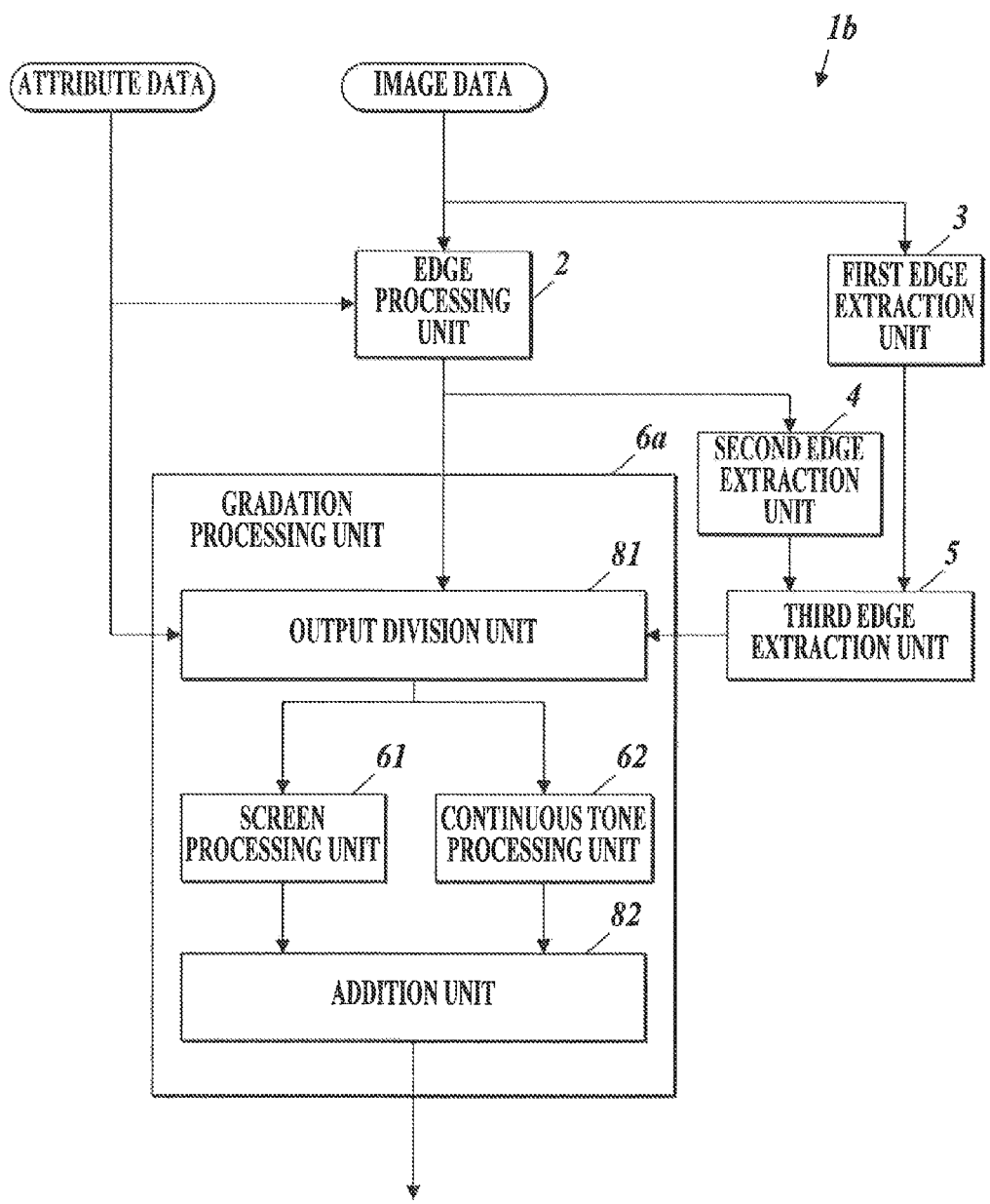
FIG. 9 is a block diagram of an image processing apparatus in accordance with an embodiment of the present invention, the image processing apparatus which adjusts the continuous-toned pixel values.

FIG. 9 shows an image processing apparatus 1b including a gradation processing unit 6a which adjusts the continuous-toned pixels value to the predetermined value. Of the image processing apparatus 1b, the components which are the same as those of the image processing apparatus 1 are denoted by the same reference numbers, and detailed description thereof is omitted.

As shown in FIG. 9, the image processing apparatus 1*b* includes the gradation processing unit 6*a*. The gradation processing unit 6*a* includes an output division unit 81 and an addition unit 82, and also includes the screen processing unit 61 and the continuous tone processing unit 62 between the output division unit 81 and the addition unit 82.

The output division unit 81 determines whether each third edge pixel outputted from the third edge extraction unit 5 is the first edge (a pixel of the first edge), the second edge (a pixel of the second edge), an adjacent pixel to the second edge in the edge direction, or a background pixel of a background, the background pixel being adjacent to the first edge or the second edge in the opposite edge direction, so as to divide the edge-processed pixel value of the third edge pixel into a pixel value for continuous tone processing and a pixel value for screen processing. The output division unit 81 outputs the pixel value for continuous tone processing to the continuous tone processing unit 62, and outputs the pixel value for screen processing to the screen processing unit 61.

The addition unit 82 sums up a pixel value (screened pixel value) inputted from the screen processing unit 61 and a pixel value (continuous-toned pixel value) inputted from the continuous tone processing unit 62 with respect to each third edge pixel, and outputs the summed pixel value.

In the following, the switch of the contents of the gradation processing is described in detail, with types of the edge processing.

[In a Case where the Pixel Values of a Background are not Changed by the Edge Processing]

If the edge processing is the smoothing processing, the thinning processing, or processing by which the smoothing processing and the thinning processing are performed in parallel, and the pixel values of the pixels of the edge of an object are reduced by the thinning processing, the third edge in the edge direction is constituted of one pixel of the first edge or the second edge, or constituted of a plurality of pixels, which are a pixel of the first edge or the second edge and an adjacent pixel to the second edge in the edge direction.

Among the third edge pixels, with respect to the first edge and the second edge, the output division unit 81 outputs the whole edge-processed pixel value to the continuous tone processing unit 62.

With respect to the adjacent pixel to the second edge in the edge direction, the output division unit 81 divides the edge-processed pixel value into the pixel value for continuous tone processing and the pixel value for screen processing. The pixel value for continuous tone processing of the adjacent pixel is obtained by subtracting the pixel value for continuous tone processing of the second edge, on which the continuous tone processing is to be performed, from the predetermined value. The pixel value for screen processing thereof is the remaining pixel value.

As shown in FIG. 7A, when only the smoothing processing is performed on an image of an object having a pixel value of 100% disposed on a background having a pixel value of 0%, the first edge shown in FIG. 5B and the second edge shown in FIG. 5D are extracted. The edge direction P of the second edge is the down direction indicated by P=7. Hence, the adjacent pixels to the four pixels of the second edge in the edge direction P are four pixels immediately under the four pixels of the second edge. That is, the third edge pixels of the third edge shown in FIG. 7B can be classified into pixels EG1, which constitute the first edge; pixels EG2, which constitute the second edge; pixels EG3, which constitute the first edge and the second edge; pixels EG4, which are adjacent to the second edge in the edge direction; and pixels EG5, which constitute the first edge, and are adjacent to the second edge in the edge direction.

The output division unit 81 outputs, among the third edge pixels of the third edge, on which the edge processing has been performed, with respect to the pixels EG1 constituting the first edge and the pixels EG2 constituting the second edge, the whole edge-processed pixel value to the continuous tone processing unit 62. Furthermore, the output division unit 81 divides the edge-processed pixel value into the pixel value for continuous tone processing and the pixel value for screen processing, and outputs the pixel value for continuous tone processing to the continuous tone processing unit 62 and the pixel value for screen processing to the screen processing unit 61, with respect to the pixels EG4 and EG5, which are adjacent to the pixels EG2 and EG3, respectively, no matter the pixels (EG5) constitute the first edge. The pixel value for continuous tone processing of each pixel EG4 is obtained by subtracting the edge-processed pixel value of the pixel EG3, which constitutes the second edge, and is adjacent to the pixel EG4, from the predetermined value. The pixel value for screen processing of the pixel EG5 is the remaining pixel value. The pixel value for continuous tone processing of each pixel EG5 is obtained by subtracting the edge-processed pixel value of the pixel EG2, which constitutes the second edge, and is adjacent to the pixel EG5, from the predetermined value. The pixel value for screen processing of the pixel EG5 is the remaining pixel value.

The addition unit 82 sums up the screened pixel value outputted from the screen processing unit 61 and the continuous-toned pixel value outputted from the continuous tone processing unit 62 so as to output the summed pixel value. Consequently, with respect to the pixels EG1, each of which constitutes the first edge, and does not have a third edge pixel adjacent in the edge direction P, only the continuous-toned pixel value is outputted. The pixels EG2 and EG3, each of which constitutes the second edge, has the pixel EG5 or EG4, which constitutes the third edge, adjacent in the edge direction. However, the total of the continuous-toned pixel value of the pixel EG2 or EG3 and the continuous-toned pixel value of the pixel EG5 or EG4 is the predetermined value. Consequently, as shown in FIG. 8A, the total of the continuous-toned pixel values of the third edge pixels adjacent in the edge direction is adjusted to the predetermined value.

In a case where only the thinning processing is performed, in the same manner as the above case where only the smoothing processing is performed, the gradation processing unit 6*a* can adjust the continuous-toned pixel values to the predetermined value.

Figure 10A:
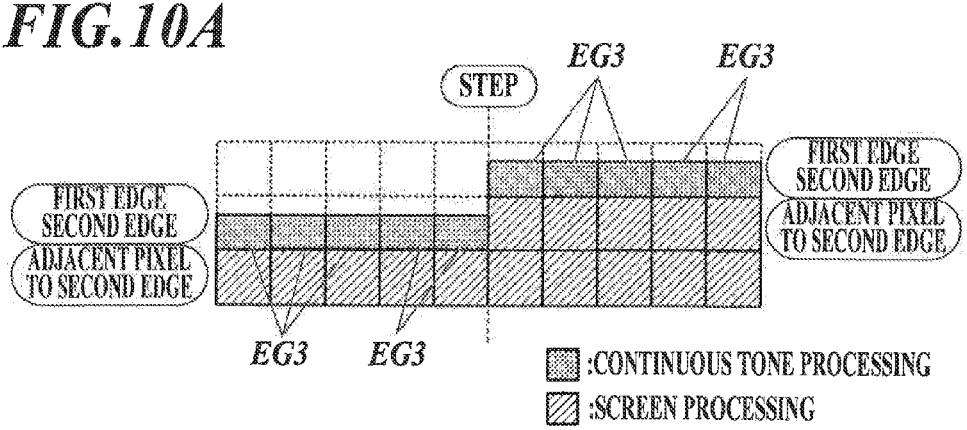
FIG. 10A shows a target region for the continuous tone processing in a case where the first edge and the second edge are extracted as the third edge in an image on which the thinning processing has been performed.

FIG. 10A shows an image obtained by performing the thinning processing on the image shown in FIG. 5A. The pixels EG3 constitute the first edge, and constitute the second edge having the pixel values changed by the thinning processing. If a target for the continuous tone processing is the third edge which consists of the first edge and the second edge only, as shown in FIG. 10A, as a result of performing the continuous tone processing on the pixels EG3 only, the region where the continuous tone processing has been performed has a cut between before and after the step.

Figure 10B:
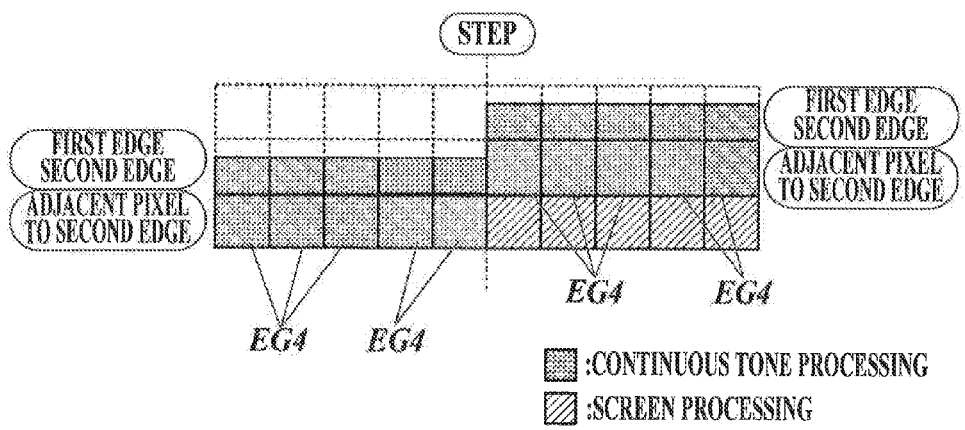
FIG. 10B shows a target region for the continuous tone processing in a case where the adjacent pixels to the second region in the edge direction are added to the third edge in the image shown in FIG. 10A.

FIG. 10B shows a target region for the continuous tone processing in a case where the pixels EG4, which are adjacent to the second edge in the edge direction, are added to the third edge in the image shown in FIG. 10A. The cut is solved. However, because the region is expanded, there is a possibility that the region looks fat.

Figure 10C:
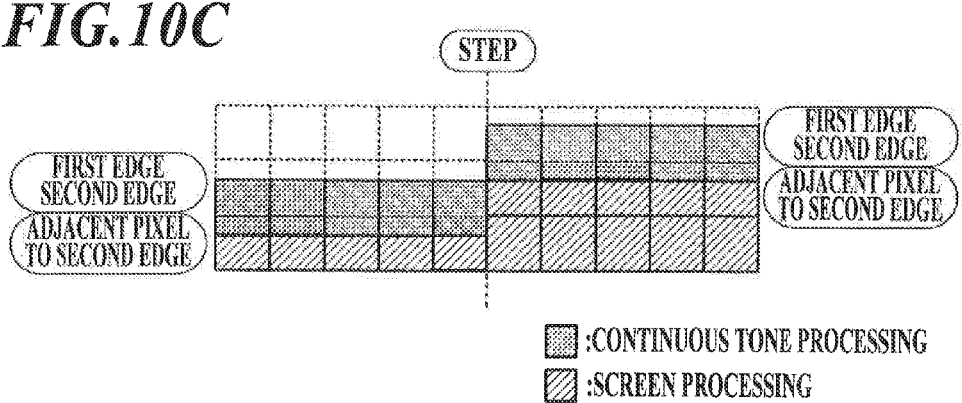
FIG. 10C shows an image obtained by adjusting the total of the continuous-toned pixel values of the third edge pixels adjacent in the edge direction to a pixel value for one pixel of the object.

FIG. 10C shows an image obtained by adjusting the continuous-toned pixel values of the third edge pixels adjacent in the edge direction to the predetermined value in the image shown in FIG. 10B by the gradation processing unit 6a, in the same manner as the case where only the smoothing processing is performed. Consequently, after printing, the densities of the pixels enhanced by the continuous tone processing are uniform, and hence fatness of an object can be prevented.

In a case where the smoothing processing and the thinning processing are performed in parallel too, in the same manner as the case where only the smoothing processing is performed, the gradation processing unit 6a can adjust the continuous-toned pixel values of the third edge pixels adjacent in the edge direction to the predetermined value.

Figure 11A:
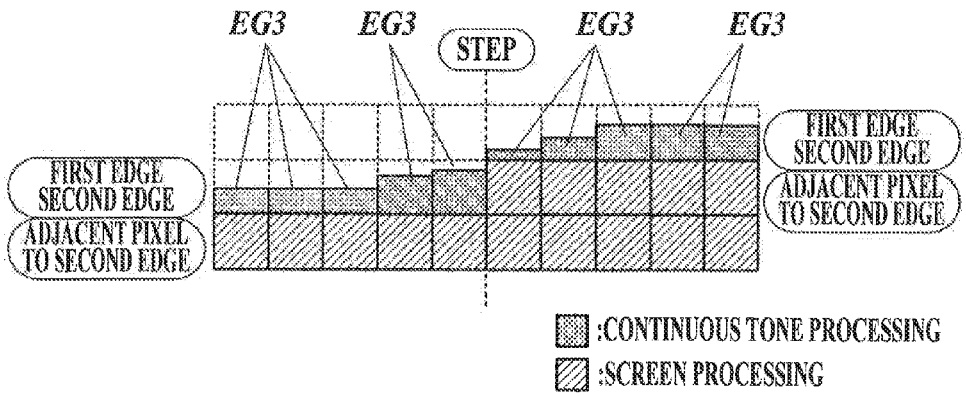
FIG. 11A shows a target region for the continuous tone processing in a case where the first edge and the second edge are extracted as the third edge in an image on which the thinning processing and the smoothing processing have been performed in parallel.

FIG. 11A shows an image obtained by performing the thinning processing and the smoothing processing in parallel on the image shown in FIG. 5A. The pixels EG3 constitute the first edge, and constitute the second edge having the pixel values changed by the thinning processing and the smoothing processing. If a target for the continuous tone processing is the third edge which consists of the first edge and the second edge only, as shown in FIG. 11A, only the pixels EG3 is the target for the continuous tone processing. Consequently, the region where the continuous tone processing has been performed is partly small (narrow) between before and after the step. Consequently, after printing, the region tends to look cut.

Figure 11B:
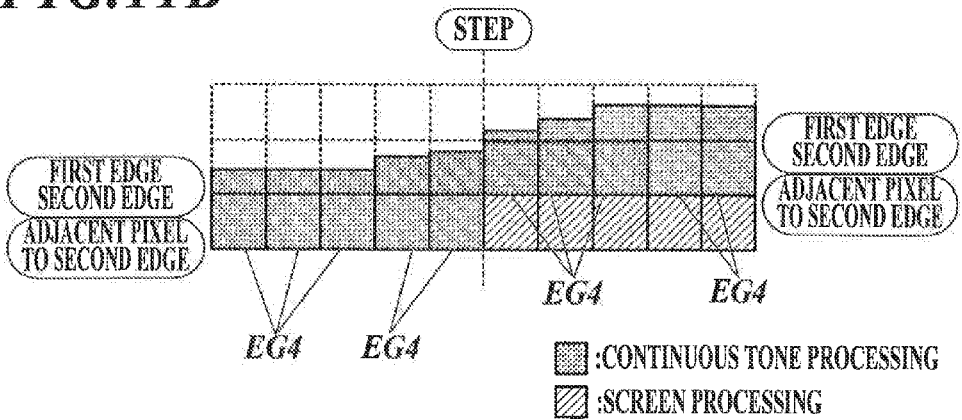
FIG. 11B shows a target region for the continuous tone processing in a case where the adjacent pixels to the second edge in the edge direction are added to the third edge in the image shown in FIG. 11A.

FIG. 11B shows a target region for the continuous tone processing in a case where the pixels EG4, which are adjacent in the edge direction P to the pixels EG3 constituting the second edge, are added to the third edge in the image shown in FIG. 11A. The partial narrowness of the region is solved. However, because the region is expanded, there is a possibility that the object is fat after printing.

Figure 11C:
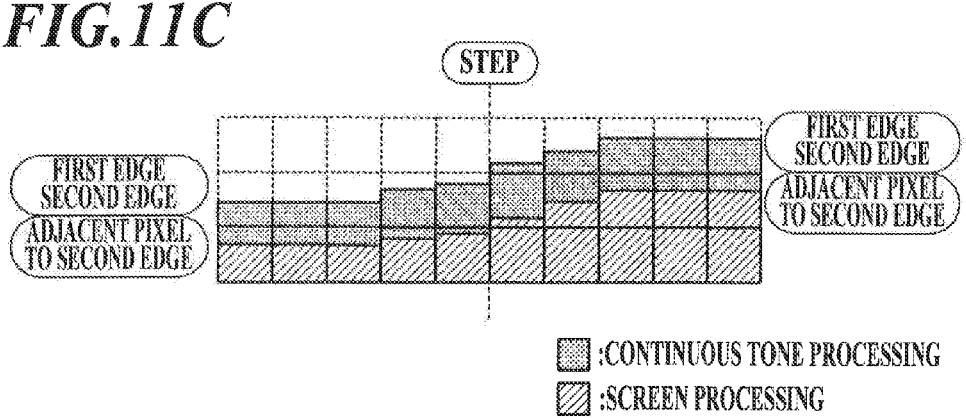
FIG. 11C shows an image obtained by adjusting the total of the continuous-toned pixel values of the third edge pixels adjacent in the edge direction shown in FIG. 11B to a pixel value for one pixel of the object.

FIG. 11C shows an image obtained by adjusting the continuous-toned pixel values of the pixels EG4 adjacent to the second edge in the edge direction to the predetermined value in the image shown in FIG. 11B by the gradation processing unit 6a, in the same manner as the case where only the smoothing processing is performed. Consequently, after printing, the densities of the pixels enhanced by the continuous tone processing are uniform, and hence fatness of an object can be prevented.

The division of pixel values is described in detail, taking the case where the thinning processing and the smoothing processing are performed in parallel as an example.

Figure 12A:
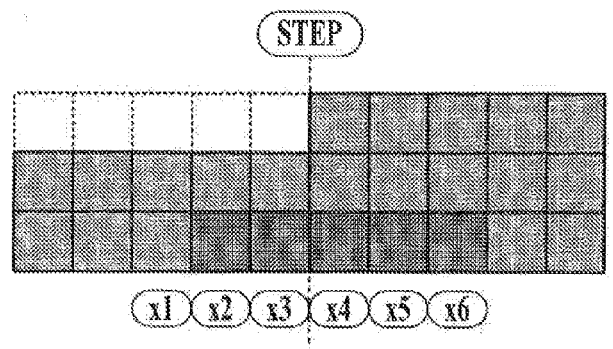
FIG. 12A shows an image of an object having a step.

FIG. 12A shows a part of an image of an object having a step disposed on a background. The background has a pixel value of 0%, and the object has a pixel value of 100%. If the thinning processing and the smoothing processing are performed in parallel on the image of the object as the edge processing, the pixel value of the first edge is changed. Hence, the pixels constituting the first edge constitute the second edge too.

A pixel value OUT of the second edge on which the thinning processing and the smoothing processing are performed in parallel is calculated by the following equation.

$$\text{OUT}(\%) = If \times (100\% + ST + SMT)$$

The If represents the original pixel value of an image of an object. The ST represents a value obtained by converting the change amount dST of the pixel value, the change amount dST being produced by the thinning processing, into a percentage with respect to the value range of pixel values. The SMT represents a value obtained by converting the change amount dSMT of the pixel value, the change amount dSMT being produced by the smoothing processing, into a percentage with respect to the value range of pixel values. For example, ST=−50% indicates that a pixel value as a target is reduced to be 50% thereof, and SMT=+25% indicates that a pixel value as a target is increased to be 125% thereof.

Figure 12B:
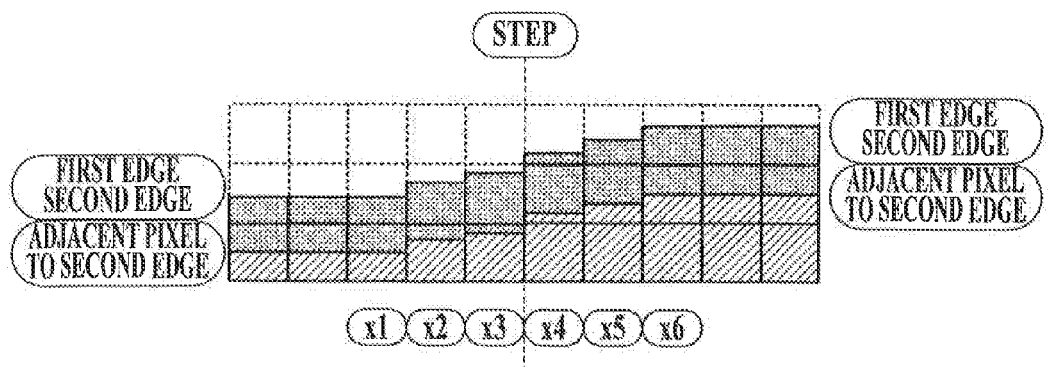
FIG. 12B shows an image obtained by adjusting the total of the continuous-toned pixel values of the third edge pixels adjacent in the edge direction to a pixel value for one pixel of the object, the pixel values being obtained after performing the thinning processing and the smoothing processing in parallel on the image shown in FIG. 12A.

FIG. 12B shows an image obtained by reducing the pixel values of the first edge of the image shown in FIG. 12A by 50% by the thinning processing, and increasing or reducing the pixel values within a range of −40% to +40% at 20% intervals taking the step as the center by the smoothing processing. The pixel values of the second edge at positions x1 to x6 in the main-scanning direction can be calculated by the equation for the pixel value OUT above. The results are shown below.

$x1: 100\% \times (100\% - 50\% + 0\%) = 50\%$ $x2: 100\% \times (100\% - 50\% + 20\%) = 70\%$ $x3: 100\% \times (100\% - 50\% + 40\%) = 90\%$ $x4: 100\% \times (100\% - 50\% - 40\%) = 10\%$ $x5: 100\% \times (100\% - 50\% - 20\%) = 30\%$ $x6: 100\% \times (100\% - 50\% - 0\%) = 50\%$ If a target for the continuous tone processing is the second edge and the adjacent pixels to the second edge in the edge direction, in the image shown in FIG. 12B, the third edge region in the edge direction is constituted of one pixel of the second edge or two pixels, namely, one pixel of the second edge and one adjacent pixel to the second edge in the edge direction.

The second edge is the first edge too, and forms the outermost of an object. Hence, as described above, the output division unit 81 makes the whole edge-processed pixel value OUT thereof a target for the continuous tone processing so as to perform the enhancement. If an image of an object has a pixel value If, and the number of pixels in the edge direction enhanced by the continuous tone processing is one pixel, the predetermined value as a target value for the adjustment is one pixel×If=If.

If the pixel value for continuous tone processing of the second edge is less than the predetermined value If, the output division unit 81 supplements the deficit by performing the continuous tone processing on the pixel value of the adjacent pixel to the second edge in the edge direction. That is, the output division unit 81 takes, of the pixel value of the adjacent pixel to the second edge in the edge direction, a pixel value (If−OUT) obtained by subtracting the pixel value OUT, on which the continuous tone processing is performed, of the second edge from the predetermined value If as a target for the continuous tone processing. Furthermore, the output division unit 81 takes the remaining pixel value {If−(If−OUT)} of the adjacent pixel to the second edge in the edge direction as a target for the screen processing so that the "whited out" is prevented from occurring.

The following TABLE 1 shows the pixel values for continuous tone processing and the pixel values for screen processing of the second edge at the positions x1 to x6 and the adjacent pixels to the second edge, the pixel values for continuous tone processing and the pixel values for screen processing into which the edge-processed pixel values thereof are divided by the output division unit 81. The pixel values for continuous tone processing undergo the continuous tone processing to obtain the continuous-toned pixel values, and the pixel values for screen processing undergo the screen processing to obtain the screened pixel values. Then, the addition unit 82 sums up the continuous-toned pixel values and the screened pixel values to obtain summed pixel values, and outputs the summed pixel values as gradation-processed pixel values on which the gradation processing has been performed.

The following equations represent the edge-processed pixel values of the second edge and the adjacent pixels to the second edge, the edge-processed pixel values each of which is divided into the pixel value for continuous tone processing and the pixel value for screen processing.

(Second Edge)

Pixel value for screen processing $S2(\%)=0$

Pixel value for continuous tone processing $C2(\%)=OUT$ (Adjacent Pixel to Second Edge)

Pixel value for screen processing $S2P(\%)=If-C2P$

Pixel value for continuous tone processing $C2P(\%)=Wd \times If-C2$

The Wd×If represents the predetermined value to which the continuous-toned pixel values are adjusted. The Wd is a coefficient to decide the number of pixels of an image of an object, the pixel values of which are used as the predetermined value, and represents the strength of the contour enhancement by the continuous tone processing. In the embodiment, Wd=1. The If represents the original pixel value of an image of an object.

In the image shown in FIG. 12A, if an image of an object has a pixel value of 50%, and accordingly is a halftone too, by the processing same as that in the case where an image of an object has a pixel value of 100%, the continuous-toned pixel values can be adjusted to the predetermined value.

smoothing processing are performed in parallel, of the second edge at the positions x1 to x6 are calculated by the equation for the pixel value OUT above. The results are shown below.

$x1: 50\% \times (100\%+50\%+0\%)=25\%$ $x2: 50\% \times (100\%+50\%+20\%)=35\%$ $x3: 50\% \times (100\%+50\%+40\%)=45\%$ $x4: 50\% \times (100\%+50\%-40\%)=5\%$ $x5: 50\% \times (100\%+50\%-20\%)=15\%$ $x6: 50\% \times (100\%+50\%-0\%)=25\%$ Because the predetermined value Wd×If for the continuous-toned pixel values is 1×50%, the output division unit 81 divides the edge-processed pixel values of the second edge and the adjacent pixel to the second edge into the pixel values for continuous tone processing and the pixel values for screen processing, as shown in the following TABLE 2, in such a way that the total of the continuous-toned pixel values of two pixels, namely, one pixel of the second edge and one adjacent pixel to the second edge, becomes a pixel value of 50%. The pixel values for continuous tone processing undergo the continuous tone processing to obtain the continuous-toned pixel values, and the pixel values for screen processing undergo the screen processing to obtain the screened pixel values. Then, the addition unit 82 sums up the continuous-toned pixel values and the screened pixel values to obtain summed pixel values, and outputs the summed pixel values as the gradation-processed pixel values.

TABLE 1

| PIXEL POSITION | SECOND EDGE | | ADJACENT PIXEL TO SECOND EDGE | |
|---|---|---|---|---|
| | PIXEL VALUE FOR SCREEN PROCESSING [%] | PIXEL VALUE FOR CONTINUOUS TONE PROCESSING [%] | PIXEL VALUE FOR SCREEN PROCESSING [%] | PIXEL VALUE FOR CONTINUOUS TONE PROCESSING [%] |
| x1 | 0 | 50 | 50 | 50 |
| x2 | 0 | 70 | 70 | 30 |
| x3 | 0 | 90 | 90 | 10 |
| x4 | 0 | 10 | 10 | 90 |
| x5 | 0 | 30 | 30 | 70 |
| x6 | 0 | 50 | 50 | 50 |

TABLE 2

| PIXEL POSITION | SECOND EDGE | | ADJACENT PIXEL TO SECOND EDGE | |
|---|---|---|---|---|
| | PIXEL VALUE FOR SCREEN PROCESSING [%] | PIXEL VALUE FOR CONTINUOUS TONE PROCESSING [%] | PIXEL VALUE FOR SCREEN PROCESSING [%] | PIXEL VALUE FOR CONTINUOUS TONE PROCESSING [%] |
| x1 | 0 | 25 | 25 | 25 |
| x2 | 0 | 35 | 35 | 15 |
| x3 | 0 | 45 | 45 | 5 |
| x4 | 0 | 5 | 5 | 45 |
| x5 | 0 | 15 | 15 | 35 |
| x6 | 0 | 25 | 25 | 25 |

Because If=50%, the pixel values (edge-processed pixel values) OUT, on which the thinning processing and the Even when an image of an object is a halftone, the difference from the case where an image of an object has a pixel value of 100% is only that the predetermined value for the adjustment is a predetermined value in accordance with the pixel value of a halftone, which is the original pixel value in this case. Hence, in the same manner as the case where an image of an object has the maximum value as a pixel value, the pixel values on which the continuous tone processing is performed can be adjusted to the predetermined value in the edge direction.

If background pixels of a background have a pixel value of a halftone, a target for the edge processing and the continuous tone processing is the pixel values each obtained by subtracting the pixel value of the background from the pixel value of the third edge. Accordingly, if the original pixel value of a background is represented by Ib, the original pixel value If of the third edge is replaced by (If−Ib) in the equations for the pixel value OUT, the pixel value for continuous tone processing and the pixel value for screen processing.

[In a Case where Pixel Values of a Background are Changed by the Edge Processing]

In a case where the pixel values of background pixels of a background for an object are changed, and the original pixel values of the background pixels are the minimum value, if, for example, the pixel values of the background pixels, the pixel values being 0%, are increased by the thinning processing, and accordingly the object is thickened (namely, is widened or becomes fat), the background pixels are extracted as the second edge. The third edge region in the edge direction is constituted of one background pixel or one pixel of the first edge or the second edge, or constituted of a plurality of pixels, namely, one background pixel, one pixel of the first edge or the second edge, and/or one adjacent pixel to the second edge in the edge direction.

Among the third edge pixels, with respect to the first edge and the second edge, the output division unit 81 outputs the original pixel value thereof to the continuous tone processing unit 62.

With respect to the background pixel, even when the background pixel constitutes the second edge, the output division unit 81 divides the pixel value thereof into the pixel value for continuous tone processing and the pixel value for screen processing. The pixel value for continuous tone processing of the background pixel is obtained by subtracting the original pixel value of the first edge or the second edge adjacent to the background pixel in the edge direction from the edge-processed pixel value of the first edge or the second edge. The pixel value for screen processing of the background pixel is the remaining pixel value.

With respect to the adjacent pixel to the second edge in the edge direction, the output division unit 81 divides the edge-processed pixel value thereof into the pixel value for continuous tone processing and the pixel value for screen processing. The pixel value for continuous tone processing of the adjacent pixel to the second edge in the edge direction is obtained by subtracting the pixel value for continuous tone processing of the second edge and the pixel value for continuous tone processing of the background pixel from the predetermined value. The pixel value for screen processing of the adjacent pixel to the second edge in the edge direction is the remaining pixel value.

In a case where the image of the object shown in FIG. 12A is thickened by the thinning processing, and accordingly the pixel values of the background pixels are changed, the background pixels are a target for the continuous tone processing as the second edge. If the number of pixels in the edge direction enhanced by the continuous tone processing is two, the predetermined value as a target value for the adjustment is two pixels×If=2×If.

Figure 13A:
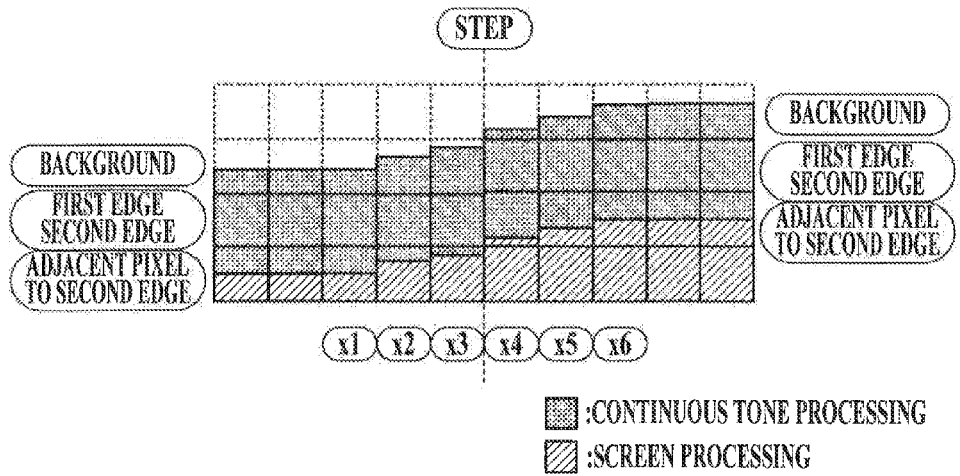
FIG. 13A shows an image obtained by adjusting the total of the continuous-toned pixel values of the third edge pixels, which includes background pixels of a background, adjacent in the edge direction to a pixel value for two pixels of the object after performing the thinning processing and the smoothing processing in parallel on the image shown in FIG. 12A.

FIG. 13A shows an image obtained by increasing the pixel values of pixels of the image of the object shown in FIG. 12A, the pixel values being 50% as a halftone, by 50% by the thinning processing, and increasing or reducing the pixel values within a range of −40% to +40% at 20% intervals taking the step as the center by the smoothing processing. As shown in FIG. 13A, by the thickening of the thinning processing, the image region of the object, which is a foreground, is expanded, and accordingly not only the pixel values of the first edge of the foreground but also the pixel values of the background pixels adjacent to the second edge in the opposite edge direction are changed. Consequently, the background and the first edge are the second edge too.

The edge-processed pixel values of the first edge of the object at the positions x1 to x6 are calculated by the equation for the pixel value OUT above. The results are shown below.

$$x1: 50\% \times (100\% + 50\% + 0\%) = 75\%$$

$$x2: 50\% \times (100\% + 50\% + 20\%) = 85\%$$

$$x3: 50\% \times (100\% + 50\% + 40\%) = 95\%$$

$$x4: 50\% \times (100\% + 50\% - 40\%) = 55\%$$

$$x5: 50\% \times (100\% + 50\% - 20\%) = 65\%$$

$$x6: 50\% \times (100\% + 50\% - 0\%) = 75\%$$

Because the pixel values of the first edge are more than the original pixel values If=50% by the thickening, the excesses which exceed 50% are left to the background pixels. The first edge is the second edge too, but either way, the edge is positioned at the outer fence which forms the contour. Consequently, the pixel values of the first edge and the pixel values transferred to the background pixels from the first edge are pixel values on which the continuous tone processing should be performed.

The output division unit 81 outputs, among the third edge pixels adjacent in the edge direction, with respect to the first edge or the second edge, the original pixel value thereof to the continuous tone processing unit 62.

With respect to the background pixels, even when the background pixels constitute the second edge, the output division unit 81 outputs the pixel value obtained by subtracting the original pixel value of the first edge or the second edge adjacent to the background pixel in the edge direction from the edge-processed pixel value of the first edge or the second edge to the continuous tone processing unit 62.

If the total of the pixel values for continuous tone processing of the first edge and the second edge, which are adjacent in the edge direction, is less than the predetermined value, the output division unit 81 supplements the deficit by performing the continuous tone processing on a part of the edge-processed pixel value of the adjacent pixel to the second edge in the edge direction. That is, the output division unit 81 outputs, of the edge-processed pixel value of the adjacent pixel to the second edge in the edge direction, the pixel value equal to the deficit to reach the predetermined value 2×If, the deficit which cannot be made up even when the continuous tone processing is performed on the whole pixel value of the second edge, to the continuous tone processing unit 62, and outputs the remaining pixel value to the screen processing unit 61. Because the pixel value of the adjacent pixel to the second edge is not changed by the edge processing, the edge-processed pixel value thereof is the same as the original pixel value thereof.

The following TABLE 3 shows the pixel values for continuous tone processing and the pixel values for screen processing of the second edge (the background and the first edge) at the positions x1 to x6 and the adjacent pixels to the second edge, the pixel values for continuous tone processing and the pixel values for screen processing into which the edge-processed pixel values thereof are divided by the output division unit 81. The pixel values for continuous tone processing undergo the continuous tone processing to obtain the continuous-toned pixel values, and the pixel values for screen processing undergo the screen processing to obtain the screened pixel values. Then, the addition unit 82 sums up the continuous-toned pixel values and the screened pixel values to obtain summed pixel values, and outputs the summed pixel values as the gradation-processed pixel values.

ground pixels are pixel values on which the screen processing should be performed because the background pixels are a target for the screen processing basically.

Consequently, among the third edge pixels adjacent in the edge direction, the output division unit 81 outputs, with respect to the first edge and the second edge, the pixel value obtained by subtracting the original pixel value of the background (background pixel) from the original pixel value of the first edge or the second edge to the continuous tone processing unit 62, and outputs the pixel value equal to the original pixel value of the background (background pixel) to the screen processing unit 61.

TABLE 3

| | SECOND EDGE | | | | ADJACENT PIXEL TO | |
| --- | --- | --- | --- | --- | --- | --- |
| | BACKGROUND | | FIRST EDGE | | SECOND EDGE | |
| PIXEL POSITION | PIXEL VALUE FOR SCREEN PROCESSING [%] | PIXEL VALUE FOR CONTINUOUS TONE PROCESSING [%] | PIXEL VALUE FOR SCREEN PROCESSING [%] | PIXEL VALUE FOR CONTINUOUS TONE PROCESSING [%] | PIXEL VALUE FOR SCREEN PROCESSING [%] | PIXEL VALUE FOR CONTINUOUS TONE PROCESSING [%] |
| x1 | 0 | 25 | 0 | 50 | 25 | 25 |
| x2 | 0 | 35 | 0 | 50 | 35 | 15 |
| x3 | 0 | 45 | 0 | 50 | 45 | 5 |
| x4 | 0 | 5 | 0 | 50 | 5 | 45 |
| x5 | 0 | 15 | 0 | 50 | 15 | 35 |
| x6 | 0 | 25 | 0 | 50 | 25 | 25 |

The following equations represent the edge-processed pixel values of the second edge (the background and the first edge) and the adjacent pixels to the second edge, the edge-processed pixel values each of which is divided into the pixel value for continuous tone processing and the pixel value for screen processing.

(Background)

Pixel value for screen processing $Sb=0$

Pixel value for continuous tone processing $Cb=\text{OUT}-If$ (First Edge)

Pixel value for screen processing $S1=0$

Pixel value for continuous tone processing $C1=\text{OUT}-(\text{OUT}-If)=If$ (Adjacent Pixel to Second Edge)

Pixel value for screen processing $S2P=If-C2P$

Pixel value for continuous tone processing $C2P=Wd\times If-C1-Cb$, wherein $Wd=2$.

Accordingly, as shown in FIG. 13A, the contour of an object can be enhanced by the continuous tone processing with the strength of a width of two pixels of the original image of the object, and fatness of the object, which is caused by expansion of the region where the continuous tone processing is performed, can be prevented.

[In a Case where Pixel Values of a Background are Changed by the Edge Processing, the Pixel Values being a Pixel Value of a Halftone]

Similarly to the above case, in a case where the pixel values of background pixels of a background for an object are changed, if the original pixel values of the background pixels are pixel values of a halftone, the pixel values of the back- With respect to the background pixels of the background, even when the background pixel constitute the second edge, the output division unit 81 outputs the original pixel value thereof to the screen processing unit 61, and outputs the pixel value obtained by subtracting the original pixel value of the first edge or the second edge, which is adjacent to the background pixel in the edge direction, from the edge-processed pixel value of the first edge or the second edge to the continuous tone processing unit 62.

With respect to the adjacent pixels to the second edge in the edge direction, the output division unit 81 divides the edge-processed pixel value thereof into the pixel value for continuous tone processing and the pixel value for screen processing so as to output the pixel values to their respective units. The pixel value for continuous tone processing of the adjacent pixel to the second edge in the edge direction is obtained by subtracting the pixel value for continuous tone processing of the second edge and the pixel value for continuous tone processing of the background pixel from the predetermined value. The pixel value for screen processing of the adjacent pixel to the second edge in the edge direction is the remaining pixel value.

Figure 13B:
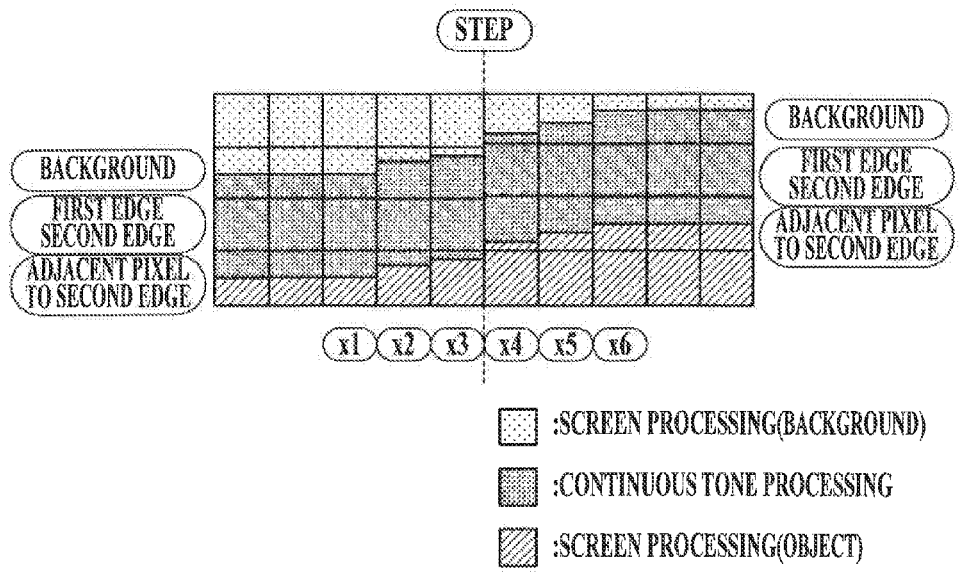
FIG. 13B shows an image obtained by adjusting the continuous-toned pixel values in the same manner as the case shown in FIG. 13A, in a case where the background pixels for the object have a pixel value of a halftone.

FIG. 13B shows an image obtained by increasing the pixel values of an object shown in FIG. 12A, the pixel values thereof being 50% as a halftone and the pixel values of a background being 10%, by 50% by the thinning processing, and increasing or reducing the pixel values within a range of −40% to +40% at 20% intervals taking the step as the center by the smoothing processing. As shown in FIG. 13B, by the thickening of the thinning processing, the image region of the object, which is a foreground, is expanded, and accordingly not only the pixel values of the first edge as a foreground but also the pixel values of the background pixels adjacent to the first edge in the opposite edge direction are changed.

Because the original pixel values of the background are 10%, and the original pixel value of the first edge as a foreground are 50%, the difference obtained by subtracting the pixel value of the background from the pixel value of the first edge is 40%. Because the thinning processing, the smoothing processing and the continuous tone processing are performed on the difference, the pixel value OUT of the first edge in the case where the thinning processing and the smoothing processing are performed in parallel is calculated by the following equation.

$$OUT=Ib+(If-Ib)\times(100+ST+SMT)$$

The Ib represents the original pixel value of the background. The If represents the original pixel value of the object.

Because If=50%, Ib=10%, ST=+50%, and SMT is changed within a range of −40% to +40% at 20% intervals one pixel to one pixel, the pixel values (edge-processed pixel values) OUT of the first edge at the positions x1 to x6 are as follows.

$x1: 10\%+40\%\times(100\%+50\%+0\%)=70\%$ $x2: 10\%+40\%\times(100\%+50\%+20\%)=78\%$ $x3: 10\%+40\%\times(100\%+50\%+40\%)=86\%$ $x4: 10\%+40\%\times(100\%+50\%-40\%)=54\%$ $x5: 10\%+40\%\times(100\%+50\%-20\%)=62\%$ $x6: 10\%+40\%\times(100\%+50\%-0\%)=20\%$ Because the pixel values of the first edge are more than the original pixel values If=50% by the thickening, the excesses which exceed 50% are left to the background pixels, which are adjacent to the first edge in the opposite edge direction. If the opposite edge directions Pa of all the pixels of the first edge are Pa=2, and accordingly the excesses are left to the background pixels immediately above the first edge, the pixel values of the background pixels at the positions x1 to x6 are as follows.

$x1: 10\%+20\%=30\%$ $x2: 10\%+28\%=38\%$ $x3: 10\%+36\%=46\%$ $x4: 10\%+4\%=14\%$ $x5: 10\%+12\%=22\%$ $x6: 10\%+20\%=30\%$

Because the first edge and the background pixels are positioned at the outer fence which forms the contour, the continuous tone processing needs to be performed on the whole pixel value thereof. However, because the continuous tone processing is performed on the difference between the pixel value of the background and the pixel value of the foreground, of the pixel value of the first edge, the pixel value on which the continuous tone processing should be performed is a pixel value corresponding to the difference between the background and the first edge. Furthermore, although the continuous tone processing should be performed on the pixel values transferred to the background pixels of the background from the first edge, the background pixels are pixels on which the screen processing should be performed basically. Hence, the excesses which exceed the original pixel values Ib of the background, Ib being 10%, are pixel values on which the screen processing should be performed. Furthermore, if the total of the continuous-toned pixel values of two pixels of the second edge, namely, the first edge and the background, is still less than the predetermined value Wd×(If−Ib), the deficit is supplemented by performing the continuous tone processing on a part of the edge-processed pixel value of the adjacent pixel to the second edge in the edge direction. Because the pixel value of the adjacent pixel to the second edge is not changed by the edge processing, the edge-processed pixel value thereof is the same as the original pixel value thereof.

The following TABLE 4 shows the pixel values for continuous tone processing and the pixel values for screen processing of the second edge (the background and the first edge) at the positions x1 to x6 and the adjacent pixels to the second edge, the pixel values for continuous tone processing and the pixel values for screen processing into which the edge-processed pixel values thereof are divided by the output division unit 81. The pixel values for continuous tone processing undergo the continuous tone processing to obtain the continuous-toned pixel values, and the pixel values for screen processing undergo the screen processing to obtain the screened pixel values. Then, the addition unit 82 sums up the continuous-toned pixel values and the screened pixel values to obtain summed pixel values, and outputs the summed pixel values as the gradation-processed pixel values.

TABLE 4

| | SECOND EDGE | | | | ADJACENT PIXEL TO | |
| --- | --- | --- | --- | --- | --- | --- |
| | BACKGROUND | | FIRST EDGE | | SECOND EDGE | |
| PIXEL POSITION | PIXEL VALUE FOR SCREEN PROCESSING [%] | PIXEL VALUE FOR CONTINUOUS TONE PROCESSING [%] | PIXEL VALUE FOR SCREEN PROCESSING [%] | PIXEL VALUE FOR CONTINUOUS TONE PROCESSING [%] | PIXEL VALUE FOR SCREEN PROCESSING [%] | PIXEL VALUE FOR CONTINUOUS TONE PROCESSING [%] |
| x1 | 10 | 20 | 10 | 40 | 30 | 20 |
| x2 | 10 | 28 | 10 | 40 | 38 | 12 |
| x3 | 10 | 36 | 10 | 40 | 46 | 4 |
| x4 | 10 | 4 | 10 | 40 | 14 | 36 |
| x5 | 10 | 12 | 10 | 40 | 22 | 28 |
| x6 | 10 | 20 | 10 | 40 | 30 | 20 |

The following equations represent the edge-processed pixel values of the second edge (the background and the first edge) and the adjacent pixels to the second edge, the edge-processed pixel values each of which is divided into the pixel value for continuous tone processing and the pixel value for screen processing.

(Background)

Pixel value for screen processing $Sb=Ib$

Pixel value for continuous tone processing $Cb=OUT-If$ (First Edge)

Pixel value for screen processing $S1=Ib$

Pixel value for continuous tone processing
$C1=\{OUT-(OUT-If)\}-Ib=If-Ib$ (Adjacent Pixel to Second Edge)

Pixel value for screen processing $S2P=If-C2P$

Pixel value for continuous tone processing $C2P=Wd\times(If-Ib)-C1-Cb$, wherein $Wd=2$.

Accordingly, as shown in FIG. 13B, even when the background is a halftone, the contour of an object can be enhanced by the continuous tone processing with the strength of a width of two pixels of the original image of the object, and fatness of the object, which is caused by expansion of the region where the continuous tone processing is performed, can be prevented.

It is possible that immediately before the screen processing unit 61 and the continuous tone processing unit 62, their respective weighting operation units be provided, and after the edge-processed pixel value is divided into the pixel value for continuous tone processing and the pixel value for screen processing, which are outputted toward the continuous tone processing unit 62 and the screen processing unit 61, respectively, the weighting operation units weight the pixel values, respectively. By the weighting, the degree of freedom in the adjustment of the strength of the screen processing and the strength of the continuous tone processing is increased.

Furthermore, conditions of the edge processing and the continuous tone processing may be set by a user.

Figure 14:
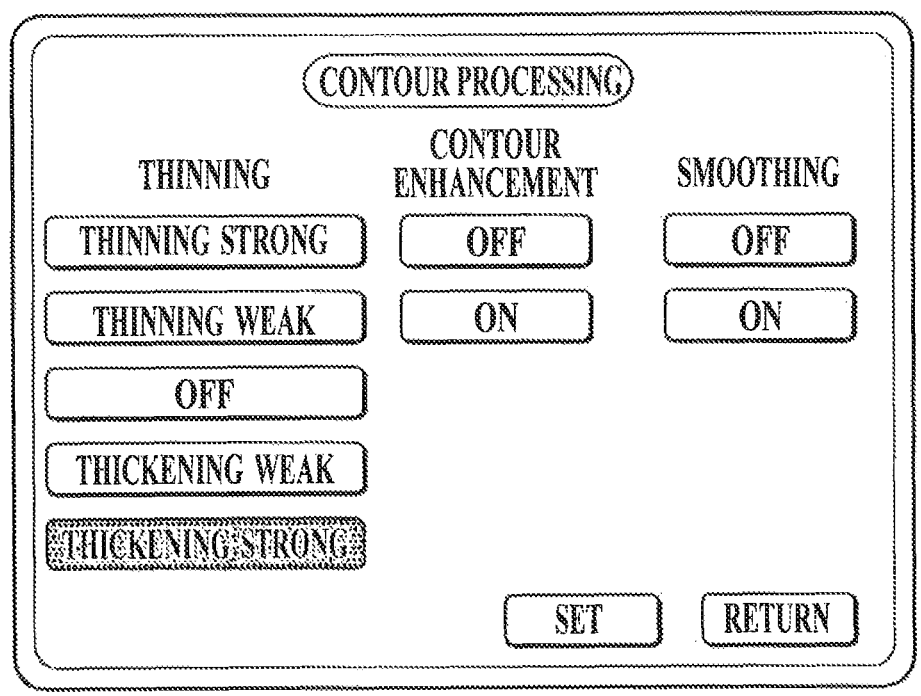
FIG. 14 shows gamma correction curves which can be switched in gamma correction processing on the basis of whether a pixel constitutes the third edge or not.

FIG. 14 shows an example of an operation screen with which a user can set the conditions of the edge processing and the continuous tone processing.

As shown in FIG. 14, on the operation screen, setting items for thinning (and thickening), counter enhancement and smoothing are provided. For the setting item for thinning, buttons to select performing or not performing thinning/thickening (thinning processing) and to select the strength, weak or strong, in a case where the thinning/thickening is performed are provided. For example, a button "Thinning Strong" corresponds to ST=−40%, a button "Thinning Weak" corresponds to ST=−20% and a button "Thickening Weak" corresponds to ST=+20%, and all correspond to a condition of "The number of pixels enhanced by the continuous tone processing Wd=one pixel". A button "Thickening Strong" corresponds to ST=+40%, and corresponds to a condition of "The number of pixels enhanced by the continuous tone processing Wd=two pixels". For the setting item for contour enhancement, buttons to select performing or not performing the contour enhancement by the continuous tone processing are provided. For the setting item for smoothing, buttons to select performing or not performing the smoothing processing are provided.

Under the conditions selected by user's button operations on the operation screen, the edge processing unit 2 performs the edge processing such as the thinning processing and the smoothing processing, and the gradation processing unit 6 performs the continuous tone processing and the screen processing.

Fifth Embodiment

In the image processing apparatus 1 shown in FIG. 1, the gradation processing unit 6 performs the continuous tone processing on a pixel of image data if the pixel constitutes the third edge (i.e. the third edge pixel). However, the gradation processing unit 6 may perform the screen processing on the edge-processed pixel value of a pixel constituting the third edge while performing the continuous tone processing thereon, and select and output the continuous-toned pixel value or the screened pixel value, whichever is larger.

More specifically, with respect to the third edge, the selector 63 selects and outputs the pixel value outputted from the screen processing unit 61 or the pixel value outputted from the continuous tone processing unit 62, whichever is larger.

Accordingly, as is the case with the first embodiment, the third edge region can be enhanced as compared with the other region, and also the strength of the enhancement of the third edge can be made higher than that in the first embodiment.

Sixth Embodiment

In the image processing apparatus 1 shown in FIG. 1, the gradation processing unit 6 switches the contents of the gradation processing, namely, the continuous tone processing and the screen processing, on the basis of determination whether or not a pixel of image data constitutes the third edge (i.e. the third edge pixel). Alternatively, the gradation processing unit 6 may perform the screen processing as the gradation processing regardless of the result of the determination, and on pixels constituting the third edge, perform the screen processing having a screen ruling (lpi) higher than that of the screen processing performed on pixels not constituting the third edge (i.e. the no-third edge pixels).

For example, in the image processing apparatus 1, the screen processing unit 61 of the gradation processing unit 6 is configured to input into itself information on the third edge from the third edge extraction unit 5. The screen processing unit 61 has a plurality of threshold value matrixes having different screen rulings. Then, the screen processing unit 61 performs the screen processing on the third edge pixels by using a threshold value matrix having the screen ruling higher than that of a threshold value matrix used for the no-third edge pixels. More specifically, it is preferable that the screen ruling used for the third edge pixels be about 2 to 20 times the screen ruling used for the no-third edge pixels.

Accordingly, density of the screen ruling formed in the third edge becomes higher than that formed outside the third edge, and hence the contour constituted of the third edge can be enhanced.

It is also effective that the gradation processing unit 6 performs not the continuous tone processing but error diffusion processing on the third edge. By the screen processing, halftones (halftone dots) each constituted of a set of dots are disposed at predetermined intervals, and gradations are expressed by the areas of the halftones. On the other hand, by the error diffusion processing, dots are disposed at random, and gradations are expressed by the density of the dots. A percentage of dots in a region by the error diffusion processing is more than that in a region by the screen processing, the regions having the same density (print density). Accordingly, by performing the error diffusion processing on the third edge, the third edge region can be enhanced as compared with the other region, on which the screen processing is performed. Furthermore, jaggies can be prevented from being generated.

For example, in the image processing apparatus 1 shown in FIG. 1, the gradation processing unit 6 includes an error diffusion processing unit instead of the continuous tone processing unit 62, and, if a pixel of image data constitutes the third edge, outputs a pixel value (error diffused pixel value) obtained by performing the error diffusion processing on the pixel with the error diffusion processing unit, and, if a pixel value thereof does not constitute the third edge, outputs a pixel value (screened pixel value) obtained by performing the screen processing on the pixel with the screen processing unit 61.

Seventh Embodiment

In the image processing apparatus 1 shown in FIG. 1, the gradation processing unit 6 may include a gamma correction processing unit so as to perform gamma correction processing on a pixel constituting the third edge (i.e. the third edge pixel) as the gradation processing, by which the pixel constituting the third edge has a ratio of an output value to an input value (an output-to-input ratio) larger than that of a pixel not constituting the third edge (i.e. the no-third edge pixel).

Accordingly, larger values are outputted as the pixel values of the third edge pixels as compared with those of the no-third edge pixels, and hence the third edge region can be enhanced as compared with the other region.

For example, with respect to the no-third edge pixels, the gradation processing unit 6 performs the gamma correction processing by using a gamma correction curve H1 shown in FIG. 15. The gamma correction curve H1 shows a relationship between input and output to correct a pixel value to have an output-to-input ratio of 1:1. On the other hand, with respect to the third edge pixels, the gradation processing unit 6 performs the gamma correction processing by using a gamma correction curve H2 shown in FIG. 15. The gamma correction curve H2 shows a relationship between input and output to correct a pixel value to have an output-to-input ratio of 1.1:1.

After the above-described gamma correction processing is performed, the continuous tone processing unit 62 may perform the continuous tone processing on the third edge pixels so as to output the continuous-toned pixel values thereof, and the screen processing unit 61 may perform the screen processing on the no-third edge pixels so as to output the screened pixel values thereof. Accordingly, the strength of the enhancement of the third edge region can be higher.

The embodiments described above are preferred examples of the present invention, and hence the present invention is not limited thereto. The present invention can be appropriately modified without departing from the spirit of the present invention.

For example, the contents of the processing performed by each component (unit or the like) of the image processing apparatus 1 may be made to be a program, and hardware such as a CPU (Central Processing Unit) may read and execute the program so as to realize the image processing method described above. As a computer readable storage medium for the program, a nonvolatile memory, such as a ROM and a flash memory, or a portable storage medium, such as a CD-ROM, can be used. Furthermore, a carrier wave can be used as a medium which provides data of the program via a communication line.

According to a first aspect of the embodiments of the present invention, there is provided an image processing apparatus including: a first edge extraction unit which determines an edge pixel of image data constituting an edge of an object by using pixel values of pixels of the image data so as to extract the edge pixel as a first edge; an edge processing unit which performs edge processing on the image data so as to change a pixel value of an edge pixel constituting the edge of the object in the edge processing or a pixel value of an adjacent pixel to the edge pixel in an opposite edge direction; a second edge extraction unit which extracts the edge pixel or the adjacent pixel having the pixel value changed by the edge processing as a second edge; a third edge extraction unit which extracts the first edge and the second edge as a third edge; and a gradation processing unit which performs gradation processing on the image data on which the edge processing has been performed, wherein the gradation processing unit switches contents of the gradation processing on the basis of whether a pixel of the image data on which the edge processing has been performed is a third edge pixel constituting the third edge or a no-third edge pixel not constituting the third edge so as to enhance a third edge region of the third edge by the gradation processing as compared with a region other than the third edge region.

Accordingly, in addition to the pixels of the edge of an object, the pixels having the pixel values changed by the edge processing can be enhanced as the third edge, and detail of an image formed by the edge processing can be reproduced. That is, even when the gradation processing is performed after the edge processing, the effect of the edge processing can be obtained.

Preferably, the third edge extraction unit extracts an adjacent pixel to the second edge in an edge direction so as to add the adjacent pixel to the third edge.

Preferably, the gradation processing is continuous tone processing or screen processing, and the gradation processing unit performs the continuous tone processing on the third edge pixel so as to output a continuous-toned pixel value, and performs the screen processing on the no-third edge pixel so as to output a screened pixel value.

Preferably, the third edge pixel is two third edge pixels or more, and the gradation processing unit adjusts, among the third edge pixels, a total of continuous-toned pixel values of third edge pixels adjacent in an edge direction to a predetermined value.

Preferably, among the third edge pixels adjacent in the edge direction, with respect to the first edge and the second edge, the gradation processing unit performs the continuous tone processing so as to output a whole edge-processed pixel value of the pixel, on which the edge processing has been performed, as a continuous-toned pixel value, and with respect to an adjacent pixel to the second edge in the edge direction, the gradation processing unit (i) performs the continuous tone processing on, of an edge-processed pixel value, a pixel value obtained by subtracting a pixel value for continuous tone processing of the second edge from the predetermined value, the pixel value for continuous tone processing on which the continuous tone processing is to be performed, so as to obtain a continuous-toned pixel value, (ii) performs the screen processing on the remaining pixel value so as to obtain a screened pixel value, (iii) sums up the continuous-toned pixel value and the screened pixel value so as to obtain a summed pixel value, and (iv) outputs the summed pixel value.

Preferably, in response to a pixel value of a background pixel constituting a background for the object being changed by the edge processing, and an original pixel value of the background pixel being a minimum value, among the third edge pixels adjacent in the edge direction, with respect to the first edge and the second edge, the gradation processing unit performs the continuous tone processing so as to output an original pixel value of the first edge or the second edge as a continuous-toned pixel value, with respect to the background pixel, the gradation processing unit performs the continuous tone processing so as to output a pixel value obtained by subtracting the original pixel value of the first edge or the second edge adjacent to the background pixel in the edge direction from an edge-processed pixel value of the first edge or the second edge, on which the edge processing has been performed, as a continuous-toned pixel value, and with respect to an adjacent pixel to the second edge in the edge direction, the gradation processing unit (i) performs the continuous tone processing on, of an edge-processed pixel value, a pixel value obtained by subtracting a pixel value for continuous tone processing of the second edge and a pixel value for continuous tone processing of the background pixel from the predetermined value, the pixel values for continuous tone processing on which the continuous tone processing is to be performed, so as to obtain a continuous-toned pixel value, (ii) performs the screen processing on the remaining pixel value so as to obtain a screened pixel value, (iii) sums up the continuous-toned pixel value and the screened pixel value so as to obtain a summed pixel value, and (iv) outputs the summed pixel value.

Preferably, in response to a pixel value of a background pixel constituting a background for the object being changed by the edge processing, and an original pixel value of the background pixel being a pixel value of a halftone, among the third edge pixels adjacent in the edge direction, with respect to the first edge and the second edge, the gradation processing unit (i) performs the continuous tone processing on a pixel value obtained by subtracting the original pixel value of the background pixel from an original pixel value of the first edge or the second edge so as to obtain a continuous-toned pixel value, (ii) performs the screen processing on a pixel value corresponding to the original pixel value of the background pixel so as to obtain a screened pixel value, (iii) sums up the continuous-toned pixel value and the screened pixel value so as to obtain a summed pixel value, and (iv) outputs the summed pixel value, with respect to the background pixel, the gradation processing unit (i) performs the screen processing on the original pixel value of the background pixel so as to obtain a screened pixel value, (ii) performs the continuous tone processing on a pixel value obtained by subtracting the original pixel value of the first edge or the second edge adjacent to the background pixel in the edge direction from an edge-processed pixel value of the first edge or the second edge, on which the edge processing has been performed, so as to obtain a continuous-toned pixel value, (iii) sums up the continuous-toned pixel value and the screened pixel value so as to obtain a summed pixel value, and (iv) outputs the summed pixel value, and with respect to an adjacent pixel to the second edge in the edge direction, the gradation processing unit (i) performs the continuous tone processing on, of an edge-processed pixel value, a pixel value obtained by subtracting a pixel value for continuous tone processing of the second edge and a pixel value for continuous tone processing of the background pixel from the predetermined value, the pixel values for continuous tone processing on which the continuous tone processing is to be performed, so as to obtain a continuous-toned pixel value, (ii) performs the screen processing on the remaining pixel value so as to obtain a screened pixel value, (iii) sums up the continuous-toned pixel value and the screened pixel value so as to obtain a summed pixel value, and (iv) outputs the summed pixel value.

Preferably, the predetermined value is a pixel value obtained by multiplying a pixel value of a pixel of the object by the number of pixels in the edge direction enhanced by the continuous tone processing.

Preferably, the gradation processing unit is screen processing or continuous tone processing, and the gradation processing unit performs the screen processing on a pixel value of the third edge pixel so as to obtain a screened pixel value while performing the continuous tone processing on the pixel value of the third edge pixel so as to obtain a continuous-toned pixel value, and selects and outputs the screened pixel value or the continuous-toned pixel value, whichever is larger.

Preferably, the gradation processing is screen processing, and the gradation processing unit performs the screen processing having a screen ruling on the third edge pixel, the screen ruling being higher than a screen ruling of the screen processing performed on the no-third edge pixel.

Preferably, the gradation processing is gamma correction processing, and the gradation processing unit performs the gamma correction processing on the third edge pixel, the gamma correction processing by which a ratio of an output value to an input value of the third edge pixel becomes higher than a ratio of an output value to an input value of the no-third edge pixel.

Preferably, the edge processing is smoothing processing, thinning processing, or processing by which the smoothing processing and the thinning processing are performed in parallel.

According to a second aspect of the embodiments of the present invention, there is provided an image processing method including: a first extraction step of determining an edge pixel of image data constituting an edge of an object by using pixel values of pixels of the image data so as to extract the edge pixel as a first edge; an edge processing step of performing edge processing on the image data so as to change a pixel value of an edge pixel constituting the edge of the object in the edge processing or a pixel value of an adjacent pixel to the edge pixel in an opposite edge direction; a second edge extraction step of extracting the edge pixel or the adjacent pixel having the pixel value changed by the edge processing as a second edge; a third edge extraction step of extracting the first edge and the second edge as a third edge; and a gradation processing step of performing gradation processing on the image data on which the edge processing has been performed, wherein in the gradation processing step, contents of the gradation processing are switched on the basis of whether a pixel of the image data on which the edge processing has been performed is a third edge pixel constituting the third edge or a no-third edge pixel not constituting the third edge so as to enhance a third edge region of the third edge by the gradation processing as compared with a region other than the third edge region.

Accordingly, in addition to the pixels of the edge of an object, the pixels having the pixel values changed by the edge processing can be enhanced as the third edge, and detail of an image formed by the edge processing can be reproduced. That is, even when the gradation processing is performed after the edge processing, the effect of the edge processing can be obtained.

Preferably, in the third edge extraction step, an adjacent pixel to the second edge in an edge direction is extracted so as to add the adjacent pixel to the third edge.

Preferably, the gradation processing is continuous tone processing or screen processing, and in the gradation processing step, the continuous tone processing is performed on the third edge pixel so as to output a continuous-toned pixel value, and the screen processing is performed on the no-third edge pixel so as to output a screened pixel value.

Preferably, the third edge pixel is two third edge pixels or more, and in the gradation processing step, among the third edge pixels, a total of continuous-toned pixel values of third edge pixels adjacent in an edge direction is adjusted to a predetermined value.

Preferably, among the third edge pixels adjacent in the edge direction, with respect to the first edge and the second edge, in the gradation processing step, the continuous tone processing is performed so as to output a whole edge-processed pixel value of the pixel, on which the edge processing has been performed, as a continuous-toned pixel value, and with respect to an adjacent pixel to the second edge in the edge direction, in the gradation processing step, (i) the continuous tone processing is performed on, of an edge-processed pixel value, a pixel value obtained by subtracting a pixel value for continuous tone processing of the second edge from the predetermined value, the pixel value for continuous tone processing on which the continuous tone processing is to be performed, so as to obtain a continuous-toned pixel value, (ii) the screen processing is performed on the remaining pixel value so as to obtain a screened pixel value, (iii) the continuous-toned pixel value and the screened pixel value are summed up so as to obtain a summed pixel value, and (iv) the summed pixel value is outputted.

Preferably, in response to a pixel value of a background pixel constituting a background for the object being changed by the edge processing, and an original pixel value of the background pixel being a minimum value, among the third edge pixels adjacent in the edge direction, with respect to the first edge and the second edge, in the gradation processing step, the continuous tone processing is performed so as to output an original pixel value of the first edge or the second edge as a continuous-toned pixel value, with respect to the background pixel, in the gradation processing step, the continuous tone processing is performed so as to output a pixel value obtained by subtracting the original pixel value of the first edge or the second edge adjacent to the background pixel in the edge direction from an edge-processed pixel value of the first edge or the second edge, on which the edge processing has been performed, as a continuous-toned pixel value, and with respect to an adjacent pixel to the second edge in the edge direction, in the gradation processing step, (i) the continuous tone processing is performed on, of an edge-processed pixel value, a pixel value obtained by subtracting a pixel value for continuous tone processing of the second edge and a pixel value for continuous tone processing of the back-ground pixel from the predetermined value, the pixel values for continuous tone processing on which the continuous tone processing is to be performed, so as to obtain a continuous-toned pixel value, (ii) the screen processing is performed on the remaining pixel value so as to obtain a screened pixel value, (iii) the continuous-toned pixel value and the screened pixel value are summed up so as to obtain a summed pixel value, and (iv) the summed pixel value is outputted.

Preferably, in response to a pixel value of a background pixel constituting a background for the object being changed by the edge processing, and an original pixel value of the background pixel being a pixel value of a halftone, among the third edge pixels adjacent in the edge direction; with respect to the first edge and the second edge, in the gradation processing step, (i) the continuous tone processing is performed on a pixel value obtained by subtracting the original pixel value of the background pixel from an original pixel value of the first edge or the second edge so as to obtain a continuous-toned pixel value, (ii) the screen processing is performed on a pixel value corresponding to the original pixel value of the background pixel so as to obtain a screened pixel value, (iii) the continuous-toned pixel value and the screened pixel value are summed up so as to obtain a summed pixel value, and (iv) the summed pixel value is outputted, with respect to the background pixel, in the gradation processing step, (i) the screen processing is performed on the original pixel value of the background pixel so as to obtain a screened pixel value, (ii) the continuous tone processing is performed on a pixel value obtained by subtracting the original pixel value of the first edge or the second edge adjacent to the background pixel in the edge direction from an edge-processed pixel value of the first edge or the second edge, on which the edge processing has been performed, so as to obtain a continuous-toned pixel value, (iii) the continuous-toned pixel value and the screened pixel value are summed up so as to obtain a summed pixel value, and (iv) the summed pixel value is outputted, and with respect to an adjacent pixel to the second edge in the edge direction, in the gradation processing step, (i) the continuous tone processing is performed on, of an edge-processed pixel value, a pixel value obtained by subtracting a pixel value for continuous tone processing of the second edge and a pixel value for continuous tone processing of the background pixel from the predetermined value, the pixel values for continuous tone processing on which the continuous tone processing is to be performed, so as to obtain a continuous-toned pixel value, (ii) the screen processing is performed on the remaining pixel value so as to obtain a screened pixel value, (iii) the continuous-toned pixel value and the screened pixel value are summed up so as to obtain a summed pixel value, and (iv) the summed pixel value is outputted.

Preferably, the predetermined value is a pixel value obtained by multiplying a pixel value of a pixel of the object by the number of pixels in the edge direction enhanced by the continuous tone processing.

This application is based upon and claims the benefit of priority under 35 USC 119 of Japanese Patent Application No. 2012-034772 filed on Feb. 21, 2012, the entire disclosure of which, including the description, claims, drawings, and abstract, is incorporated herein by reference in its entirety.

What is claimed is:

1. An image processing apparatus comprising:
   a first edge extraction unit which determines an edge pixel of image data constituting an edge of an object by using pixel values of pixels of the image data so as to extract the edge pixel as a first edge;
   an edge processing unit which performs edge processing on the image data so as to change a pixel value of an edge pixel constituting the edge of the object in the edge processing or a pixel value of an adjacent pixel to the edge pixel in an opposite edge direction;
   a second edge extraction unit which extracts the edge pixel or the adjacent pixel having the pixel value changed by the edge processing as a second edge;
   a third edge extraction unit which extracts the first edge and the second edge as a third edge; and
   a gradation processing unit which performs gradation processing on the image data on which the edge processing has been performed, wherein
   the gradation processing unit switches contents of the gradation processing on the basis of whether a pixel of the image data on which the edge processing has been performed is a third edge pixel constituting the third edge or a no-third edge pixel not constituting the third edge so as to enhance a third edge region of the third edge by the gradation processing as compared with a region other than the third edge region.

2. The image processing apparatus according to claim 1, wherein the third edge extraction unit extracts an adjacent pixel to the second edge in an edge direction so as to add the adjacent pixel to the third edge.

3. The image processing apparatus according to claim 1, wherein the gradation processing is continuous tone processing or screen processing, and the gradation processing unit performs the continuous tone processing on the third edge pixel so as to output a continuous-toned pixel value, and performs the screen processing on the no-third edge pixel so as to output a screened pixel value.

4. The image processing apparatus according to claim 3, wherein the third edge pixel is two third edge pixels or more, and the gradation processing unit adjusts, among the third edge pixels, a total of continuous-toned pixel values of third edge pixels adjacent in an edge direction to a predetermined value.

5. The image processing apparatus according to claim 4, wherein, among the third edge pixels adjacent in the edge direction, with respect to the first edge and the second edge, the gradation processing unit performs the continuous tone processing so as to output a whole edge-processed pixel value of the pixel, on which the edge processing has been performed, as a continuous-toned pixel value, and with respect to an adjacent pixel to the second edge in the edge direction, the gradation processing unit (i) performs the continuous tone processing on, of an edge-processed pixel value, a pixel value obtained by subtracting a pixel value for continuous tone processing of the second edge from the predetermined value, the pixel value for continuous tone processing on which the continuous tone processing is to be performed, so as to obtain a continuous-toned pixel value, (ii) performs the screen processing on the remaining pixel value so as to obtain a screened pixel value, (iii) sums up the continuous-toned pixel value and the screened pixel value so as to obtain a summed pixel value, and (iv) outputs the summed pixel value.

6. The image processing apparatus according to claim 4, wherein in response to a pixel value of a background pixel constituting a background for the object being changed by the edge processing, and an original pixel value of the background pixel being a minimum value, among the third edge pixels adjacent in the edge direction, with respect to the first edge and the second edge, the gradation processing unit performs the continuous tone processing so as to output an original pixel value of the first edge or the second edge as a continuous-toned pixel value, with respect to the background pixel, the gradation processing unit performs the continuous tone processing so as to output a pixel value obtained by subtracting the original pixel value of the first edge or the second edge adjacent to the background pixel in the edge direction from an edge-processed pixel value of the first edge or the second edge, on which the edge processing has been performed, as a continuous-toned pixel value, and with respect to an adjacent pixel to the second edge in the edge direction, the gradation processing unit (i) performs the continuous tone processing on, of an edge-processed pixel value, a pixel value obtained by subtracting a pixel value for continuous tone processing of the second edge and a pixel value for continuous tone processing of the background pixel from the predetermined value, the pixel values for continuous tone processing on which the continuous tone processing is to be performed, so as to obtain a continuous-toned pixel value, (ii) performs the screen processing on the remaining pixel value so as to obtain a screened pixel value, (iii) sums up the continuous-toned pixel value and the screened pixel value so as to obtain a summed pixel value, and (iv) outputs the summed pixel value.

7. The image processing apparatus according to claim 4, wherein in response to a pixel value of a background pixel constituting a background for the object being changed by the edge processing, and an original pixel value of the background pixel being a pixel value of a halftone, among the third edge pixels adjacent in the edge direction, with respect to the first edge and the second edge, the gradation processing unit (i) performs the continuous tone processing on a pixel value obtained by subtracting the original pixel value of the background pixel from an original pixel value of the first edge or the second edge so as to obtain a continuous-toned pixel value, (ii) performs the screen processing on a pixel value corresponding to the original pixel value of the background pixel so as to obtain a screened pixel value, (iii) sums up the continuous-toned pixel value and the screened pixel value so as to obtain a summed pixel value, and (iv) outputs the summed pixel value, with respect to the background pixel, the gradation processing unit (i) performs the screen processing on the original pixel value of the background pixel so as to obtain a screened pixel value, (ii) performs the continuous tone processing on a pixel value obtained by subtracting the original pixel value of the first edge or the second edge adjacent to the background pixel in the edge direction from an edge-processed pixel value of the first edge or the second edge, on which the edge processing has been performed, so as to obtain a continuous-toned pixel value, (iii) sums up the continuous-toned pixel value and the screened pixel value so as to obtain a summed pixel value, and (iv) outputs the summed pixel value, and with respect to an adjacent pixel to the second edge in the edge direction, the gradation processing unit (i) performs the continuous tone processing on, of an edge-processed pixel value, a pixel value obtained by subtracting a pixel value for continuous tone processing of the second edge and a pixel value for continuous tone processing of the background pixel from the predetermined value, the pixel values for continuous tone processing on which the continuous tone processing is to be performed, so as to obtain a continuous-toned pixel value, (ii) performs the screen processing on the remaining pixel value so as to obtain a screened pixel value, (iii) sums up the continuous-toned pixel value and the screened pixel value so as to obtain a summed pixel value, and (iv) outputs the summed pixel value.

8. The image processing apparatus according to claim 4, wherein the predetermined value is a pixel value obtained by multiplying a pixel value of a pixel of the object by the number of pixels in the edge direction enhanced by the continuous tone processing.

9. The image processing apparatus according to claim 1, wherein the gradation processing unit is screen processing or continuous tone processing, and the gradation processing unit performs the screen processing on a pixel value of the third edge pixel so as to obtain a screened pixel value while performing the continuous tone processing on the pixel value of the third edge pixel so as to obtain a continuous-toned pixel value, and selects and outputs the screened pixel value or the continuous-toned pixel value, whichever is larger.

10. The image processing apparatus according to claim 1, wherein
the gradation processing is screen processing, and
the gradation processing unit performs the screen processing having a screen ruling on the third edge pixel, the screen ruling being higher than a screen ruling of the screen processing performed on the no-third edge pixel.

11. The image processing apparatus according to claim 1, wherein
the gradation processing is gamma correction processing, and
the gradation processing unit performs the gamma correction processing on the third edge pixel, the gamma correction processing by which a ratio of an output value to an input value of the third edge pixel becomes higher than a ratio of an output value to an input value of the no-third edge pixel.

12. The image processing apparatus according to claim 1, wherein the edge processing is smoothing processing, thinning processing, or processing by which the smoothing processing and the thinning processing are performed in parallel.

13. An image processing method comprising:
a first edge extraction step of determining an edge pixel of image data constituting an edge of an object by using pixel values of pixels of the image data so as to extract the edge pixel as a first edge;
an edge processing step of performing edge processing on the image data so as to change a pixel value of an edge pixel constituting the edge of the object in the edge processing or a pixel value of an adjacent pixel to the edge pixel in an opposite edge direction;
a second edge extraction step of extracting the edge pixel or the adjacent pixel having the pixel value changed by the edge processing as a second edge;
a third edge extraction step of extracting the first edge and the second edge as a third edge; and
a gradation processing step of performing gradation processing on the image data on which the edge processing has been performed, wherein
in the gradation processing step, contents of the gradation processing are switched on the basis of whether a pixel of the image data on which the edge processing has been performed is a third edge pixel constituting the third edge or a no-third edge pixel not constituting the third edge so as to enhance a third edge region of the third edge by the gradation processing as compared with a region other than the third edge region.

14. The image processing method according to claim 13, wherein in the third edge extraction step, an adjacent pixel to the second edge in an edge direction is extracted so as to add the adjacent pixel to the third edge.

15. The image processing method according to claim 13, wherein
the gradation processing is continuous tone processing or screen processing, and
in the gradation processing step, the continuous tone processing is performed on the third edge pixel so as to output a continuous-toned pixel value, and the screen processing is performed on the no-third edge pixel so as to output a screened pixel value.

16. The image processing method according to claim 15, wherein the third edge pixel is two third edge pixels or more, and
in the gradation processing step, among the third edge pixels, a total of continuous-toned pixel values of third edge pixels adjacent in an edge direction is adjusted to a predetermined value.

17. The image processing method according to claim 16, wherein, among the third edge pixels adjacent in the edge direction,
with respect to the first edge and the second edge, in the gradation processing step, the continuous tone processing is performed so as to output a whole edge-processed pixel value of the pixel, on which the edge processing has been performed, as a continuous-toned pixel value, and
with respect to an adjacent pixel to the second edge in the edge direction, in the gradation processing step, (i) the continuous tone processing is performed on, of an edge-processed pixel value, a pixel value obtained by subtracting a pixel value for continuous tone processing of the second edge from the predetermined value, the pixel value for continuous tone processing on which the continuous tone processing is to be performed, so as to obtain a continuous-toned pixel value, (ii) the screen processing is performed on the remaining pixel value so as to obtain a screened pixel value, (iii) the continuous-toned pixel value and the screened pixel value are summed up so as to obtain a summed pixel value, and (iv) the summed pixel value is outputted.

18. The image processing method according to claim 16, wherein
in response to a pixel value of a background pixel constituting a background for the object being changed by the edge processing, and an original pixel value of the background pixel being a minimum value, among the third edge pixels adjacent in the edge direction,
with respect to the first edge and the second edge, in the gradation processing step, the continuous tone processing is performed so as to output an original pixel value of the first edge or the second edge as a continuous-toned pixel value,
with respect to the background pixel, in the gradation processing step, the continuous tone processing is performed so as to output a pixel value obtained by subtracting the original pixel value of the first edge or the second edge adjacent to the background pixel in the edge direction from an edge-processed pixel value of the first edge or the second edge, on which the edge processing has been performed, as a continuous-toned pixel value, and
with respect to an adjacent pixel to the second edge in the edge direction, in the gradation processing step, (i) the continuous tone processing is performed on, of an edge-processed pixel value, a pixel value obtained by subtracting a pixel value for continuous tone processing of the second edge and a pixel value for continuous tone processing of the background pixel from the predetermined value, the pixel values for continuous tone processing on which the continuous tone processing is to be performed, so as to obtain a continuous-toned pixel value, (ii) the screen processing is performed on the remaining pixel value so as to obtain a screened pixel value, (iii) the continuous-toned pixel value and the screened pixel value are summed up so as to obtain a summed pixel value, and (iv) the summed pixel value is outputted.

19. The image processing method according to claim 16, wherein in response to a pixel value of a background pixel constituting a background for the object being changed by the edge processing, and an original pixel value of the background pixel being a pixel value of a halftone, among the third edge pixels adjacent in the edge direction;

with respect to the first edge and the second edge, in the gradation processing step, (i) the continuous tone processing is performed on a pixel value obtained by subtracting the original pixel value of the background pixel from an original pixel value of the first edge or the second edge so as to obtain a continuous-toned pixel value, (ii) the screen processing is performed on a pixel value corresponding to the original pixel value of the background pixel so as to obtain a screened pixel value, (iii) the continuous-toned pixel value and the screened pixel value are summed up so as to obtain a summed pixel value, and (iv) the summed pixel value is outputted, with respect to the background pixel, in the gradation processing step, (i) the screen processing is performed on the original pixel value of the background pixel so as to obtain a screened pixel value, (ii) the continuous tone processing is performed on a pixel value obtained by subtracting the original pixel value of the first edge or the second edge adjacent to the background pixel in the edge direction from an edge-processed pixel value of the first edge or the second edge, on which the edge processing has been performed, so as to obtain a continuous-toned pixel value, (iii) the continuous-toned pixel value and the screened pixel value are summed up so as to obtain a summed pixel value, and (iv) the summed pixel value is outputted, and with respect to an adjacent pixel to the second edge in the edge direction, in the gradation processing step, (i) the continuous tone processing is performed on, of an edge-processed pixel value, a pixel value obtained by subtracting a pixel value for continuous tone processing of the second edge and a pixel value for continuous tone processing of the background pixel from the predetermined value, the pixel values for continuous tone processing on which the continuous tone processing is to be performed, so as to obtain a continuous-toned pixel value, (ii) the screen processing is performed on the remaining pixel value so as to obtain a screened pixel value, (iii) the continuous-toned pixel value and the screened pixel value are summed up so as to obtain a summed pixel value, and (iv) the summed pixel value is outputted.

20. The image processing method according to claim 16, wherein the predetermined value is a pixel value obtained by multiplying a pixel value of a pixel of the object by the number of pixels in the edge direction enhanced by the continuous tone processing.

* * * * *